(12) United States Patent
Augusto Lopes et al.

(10) Patent No.: US 10,785,113 B2
(45) Date of Patent: Sep. 22, 2020

(54) SYSTEMS AND METHODS FOR SELF-CONFIGURING NODES AND MODES OF COMMUNICATION IN A NETWORK OF MOVING THINGS

(71) Applicant: Veniam, Inc., Mountain View, CA (US)

(72) Inventors: Diogo Miguel Augusto Lopes, Aveiro (PT); Tiago Silvestre Condeixa, Aveiro (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 16/164,490

(22) Filed: Oct. 18, 2018

(65) Prior Publication Data
US 2019/0149417 A1 May 16, 2019

Related U.S. Application Data

(60) Provisional application No. 62/584,958, filed on Nov. 13, 2017.

(51) Int. Cl.
| | |
|---|---|
| *H04L 12/24* | (2006.01) |
| *H04W 84/00* | (2009.01) |
| *H04W 4/40* | (2018.01) |
| *H04W 4/06* | (2009.01) |
| *H04L 29/08* | (2006.01) |
| *H04W 4/46* | (2018.01) |
| *H04L 29/06* | (2006.01) |

(52) U.S. Cl.
CPC ...... *H04L 41/0886* (2013.01); *H04L 41/0816* (2013.01); *H04L 63/10* (2013.01); *H04L 67/104* (2013.01); *H04L 67/16* (2013.01); *H04W 4/06* (2013.01); *H04W 4/40* (2018.02); *H04W 4/46* (2018.02); *H04W 84/005* (2013.01)

(58) Field of Classification Search
CPC . H04L 41/0886; H04L 41/0816; H04L 63/10; H04L 67/16; H04L 67/104; H04W 4/46; H04W 4/06; H04W 4/40; H04W 84/005
See application file for complete search history.

(56) References Cited

U.S. PATENT DOCUMENTS

| 8,943,167 | B2* | 1/2015 | Aurongzeb | H04L 67/141 709/217 |
|---|---|---|---|---|
| 9,407,362 | B2* | 8/2016 | DeVaul | H04B 10/1129 |
| 9,519,045 | B2* | 12/2016 | Knoblach | B64B 1/40 |
| 9,596,020 | B2* | 3/2017 | Frolov | H04B 7/18504 |
| 10,374,695 | B2* | 8/2019 | Barritt | H04B 10/1123 |
| 2017/0061790 | A1* | 3/2017 | Jana | H04W 4/023 |
| 2017/0093866 | A1* | 3/2017 | Ben-Noon | G06F 21/35 |

(Continued)

*Primary Examiner* — Brian T O Connor
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things). In particular, systems and methods for self-configuring nodes and modes of communication in a network of moving things.

21 Claims, 16 Drawing Sheets

(56) References Cited

U.S. PATENT DOCUMENTS

| | | |
|---|---|---|
| 2019/0090174 A1 | 3/2019 | Rocci et al. |
| 2019/0093619 A1* | 3/2019 | Vadlamani .......... F02N 11/0833 |
| 2019/0171225 A1* | 6/2019 | Switkes ............. B60W 30/165 |
| 2019/0306678 A1* | 10/2019 | Byun .................... H04L 5/0055 |
| 2020/0021950 A1* | 1/2020 | Ma ...................... H04W 72/005 |

* cited by examiner

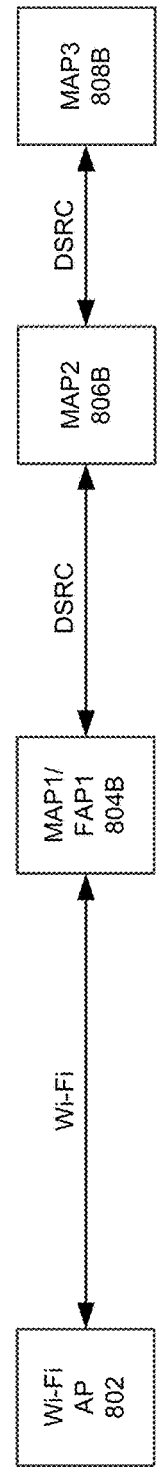
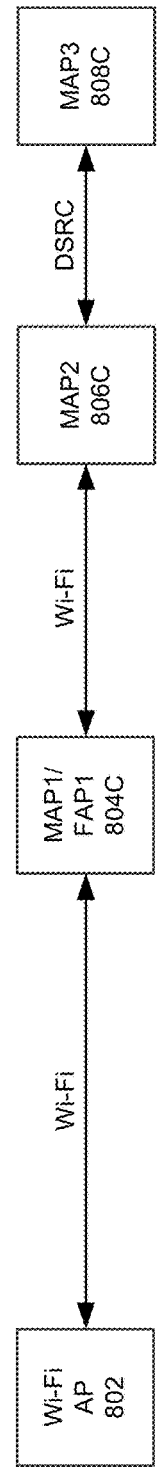
Figure 8A
Figure 8B
Figure 8C

SYSTEMS AND METHODS FOR SELF-CONFIGURING NODES AND MODES OF COMMUNICATION IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/584,958, filed on Nov. 13, 2017, and titled "Systems and Methods for Self-Configuring Nodes and Modes of Communication in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIGS. 8A-8C are high-level block diagrams illustrating an example change of operational mode of a node of a network, in accordance with various aspects of the present disclosure.

SUMMARY

Figure 1:
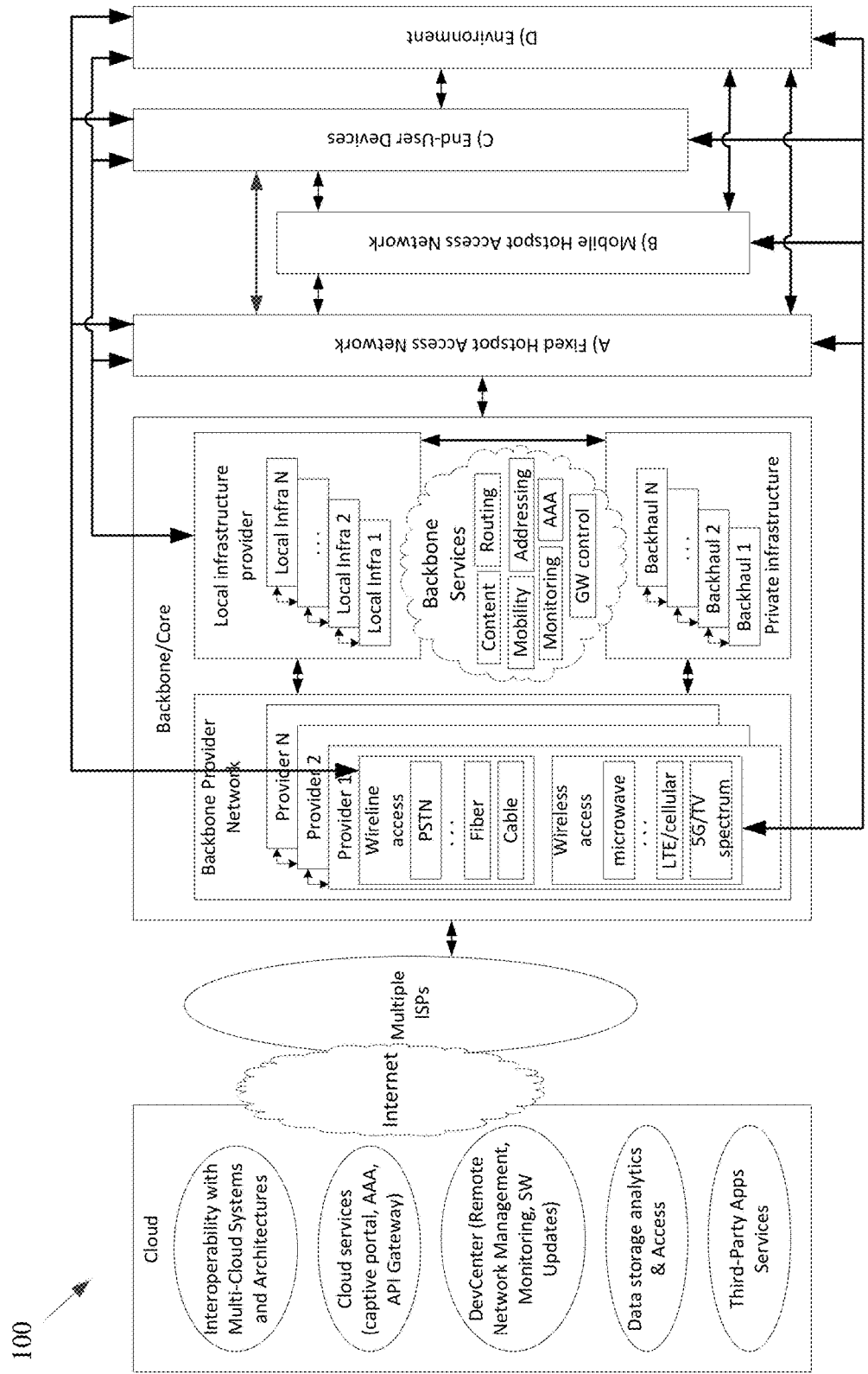
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
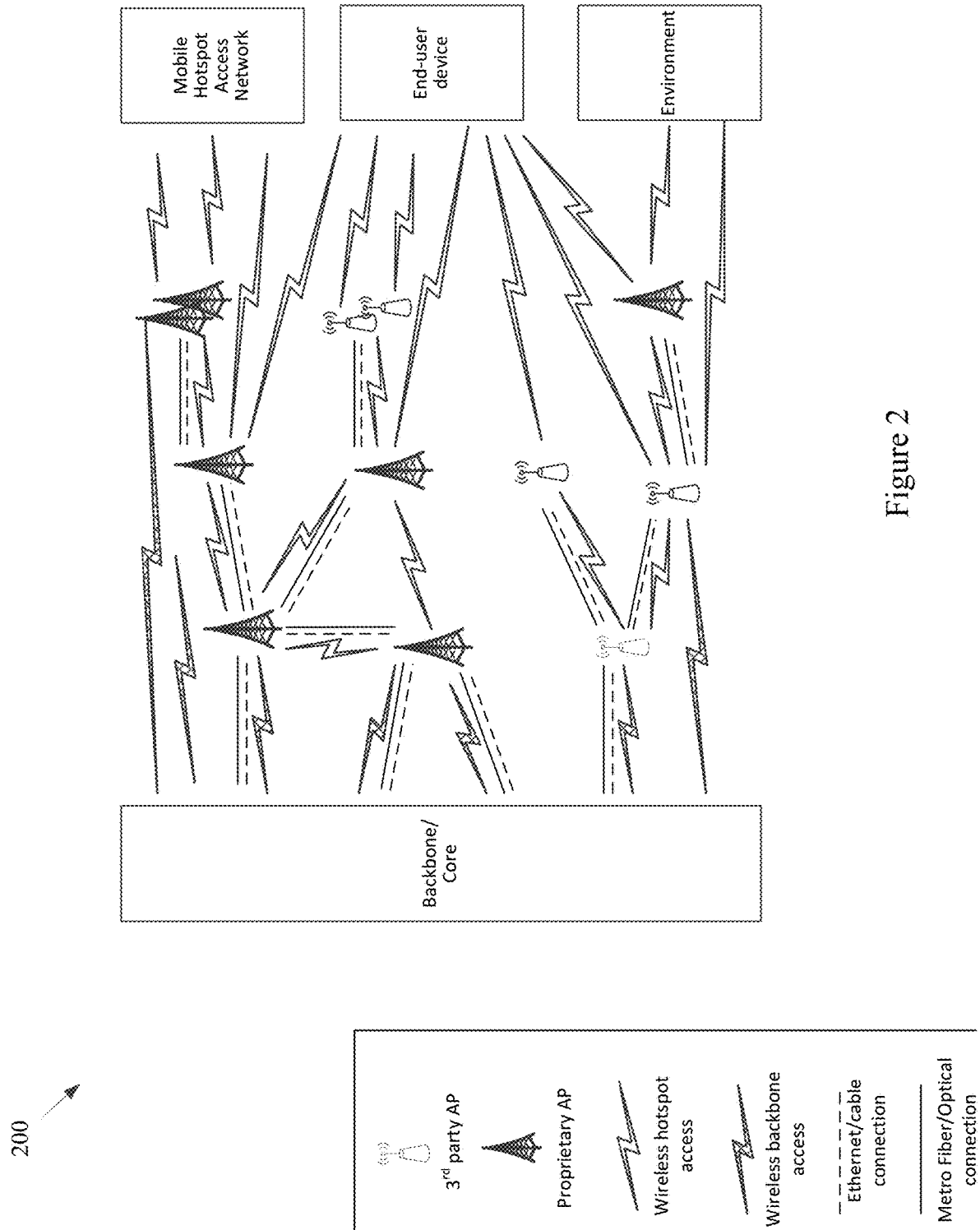
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
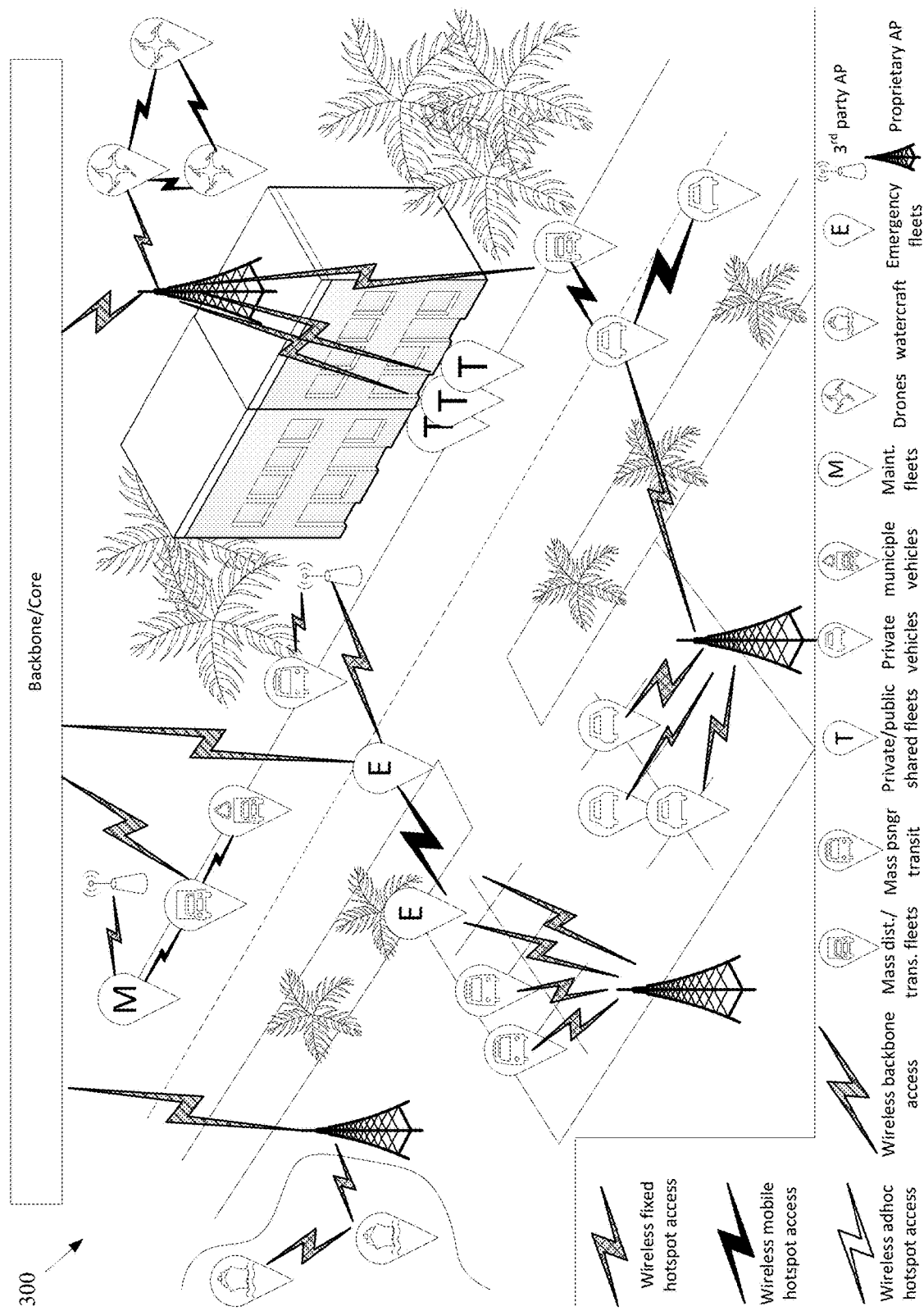
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
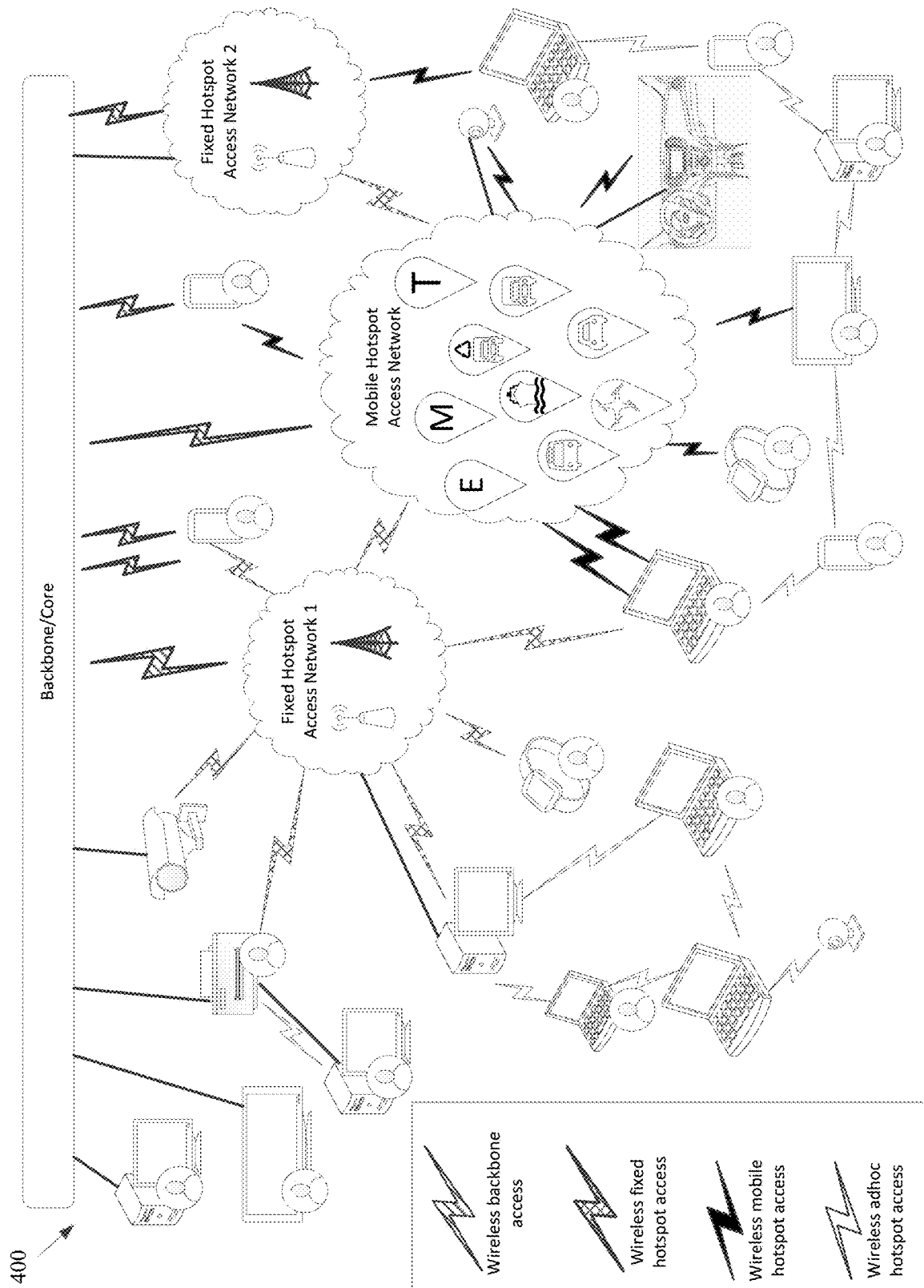
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
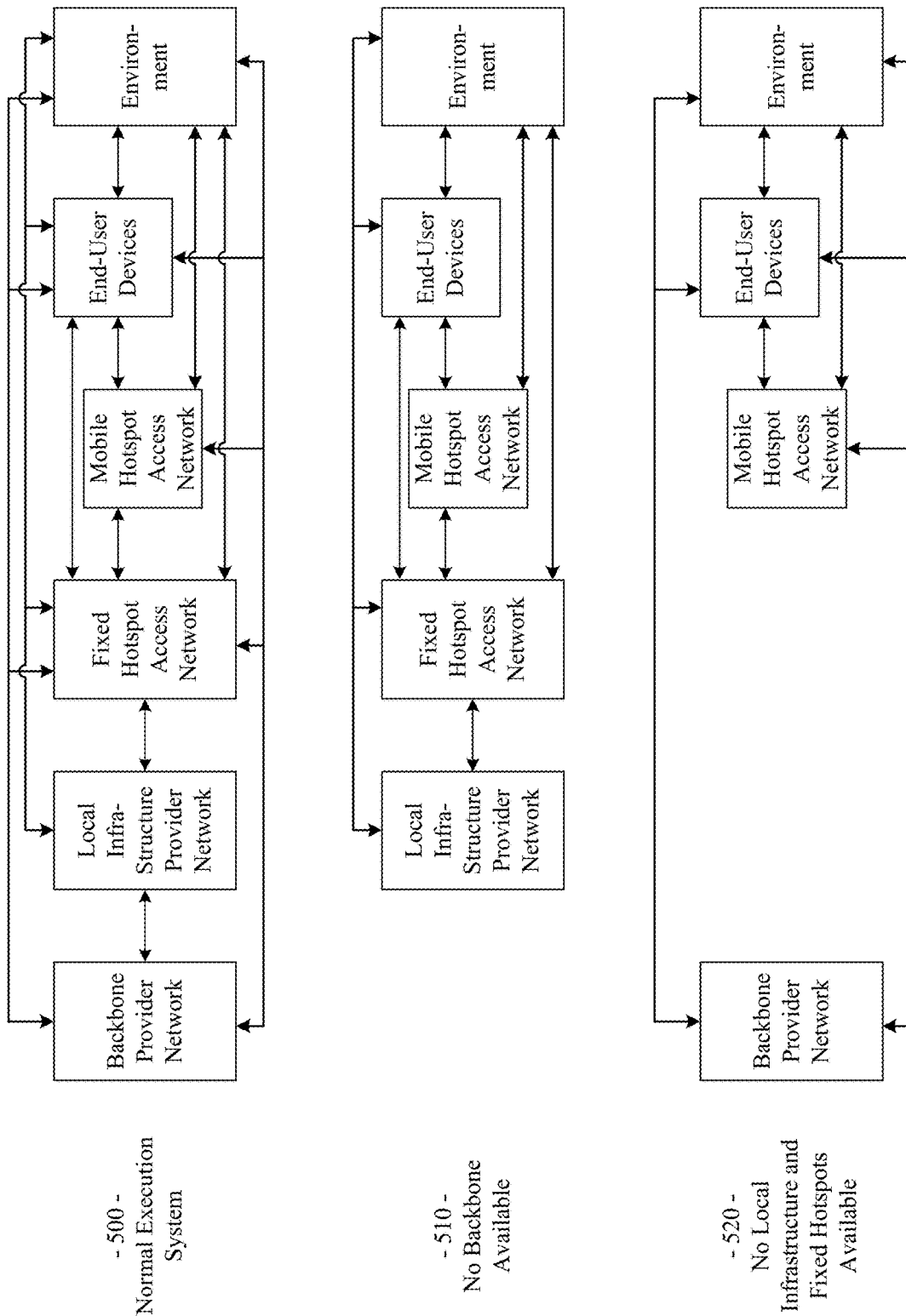
FIGS. 5A-5C show a plurality of network configurations illustrating the flexibility and/or and resiliency of a communication network, in accordance with various aspects of this disclosure.
Figure 5B:
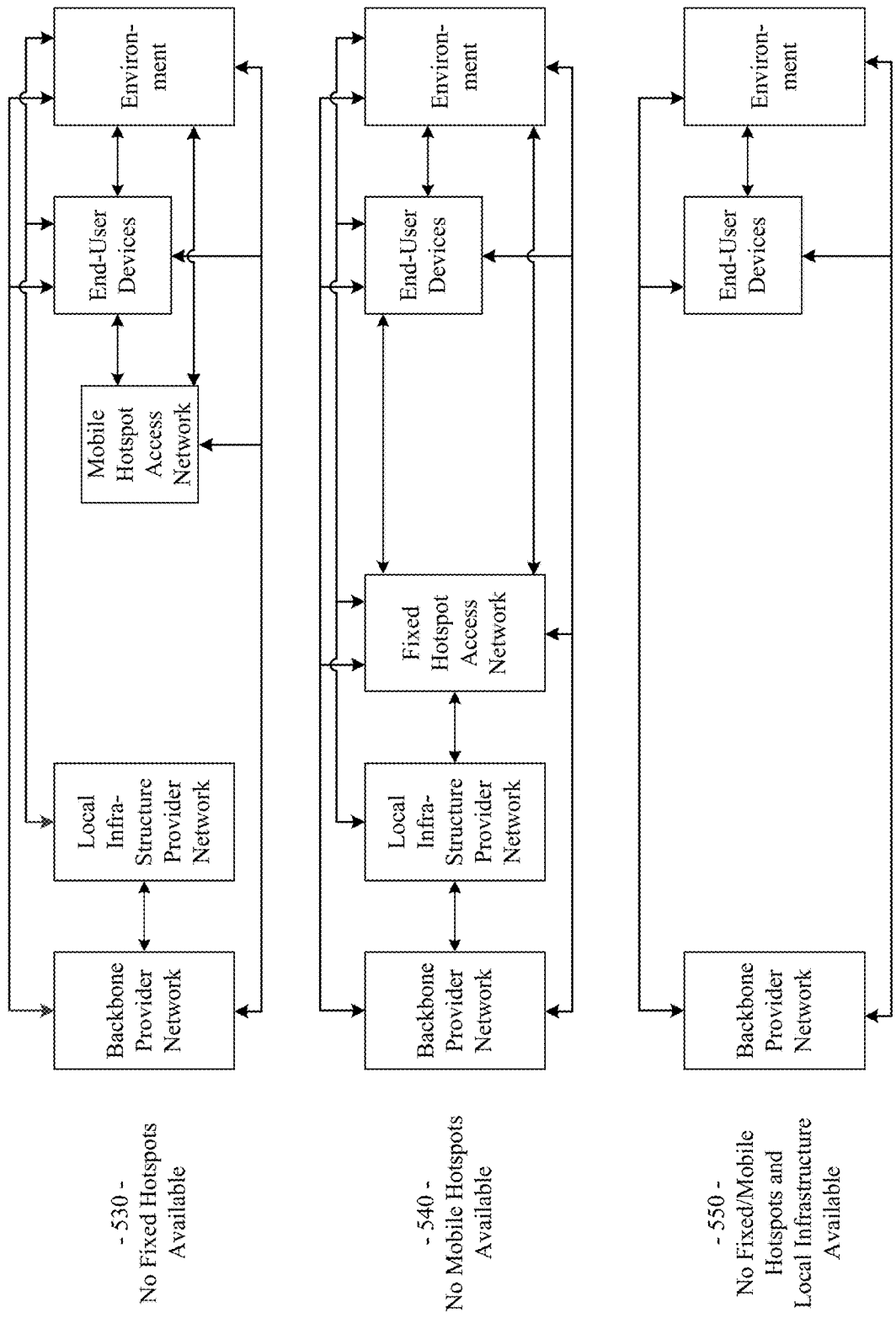
Figure 5C:
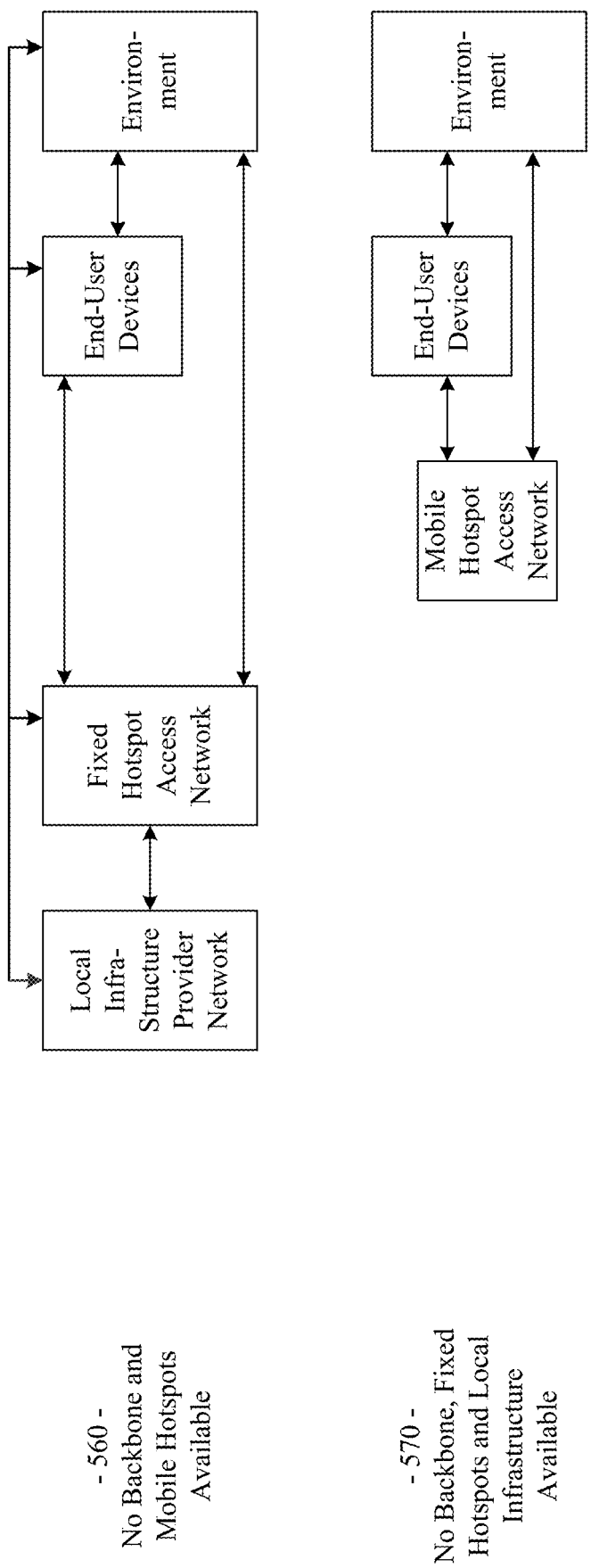

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
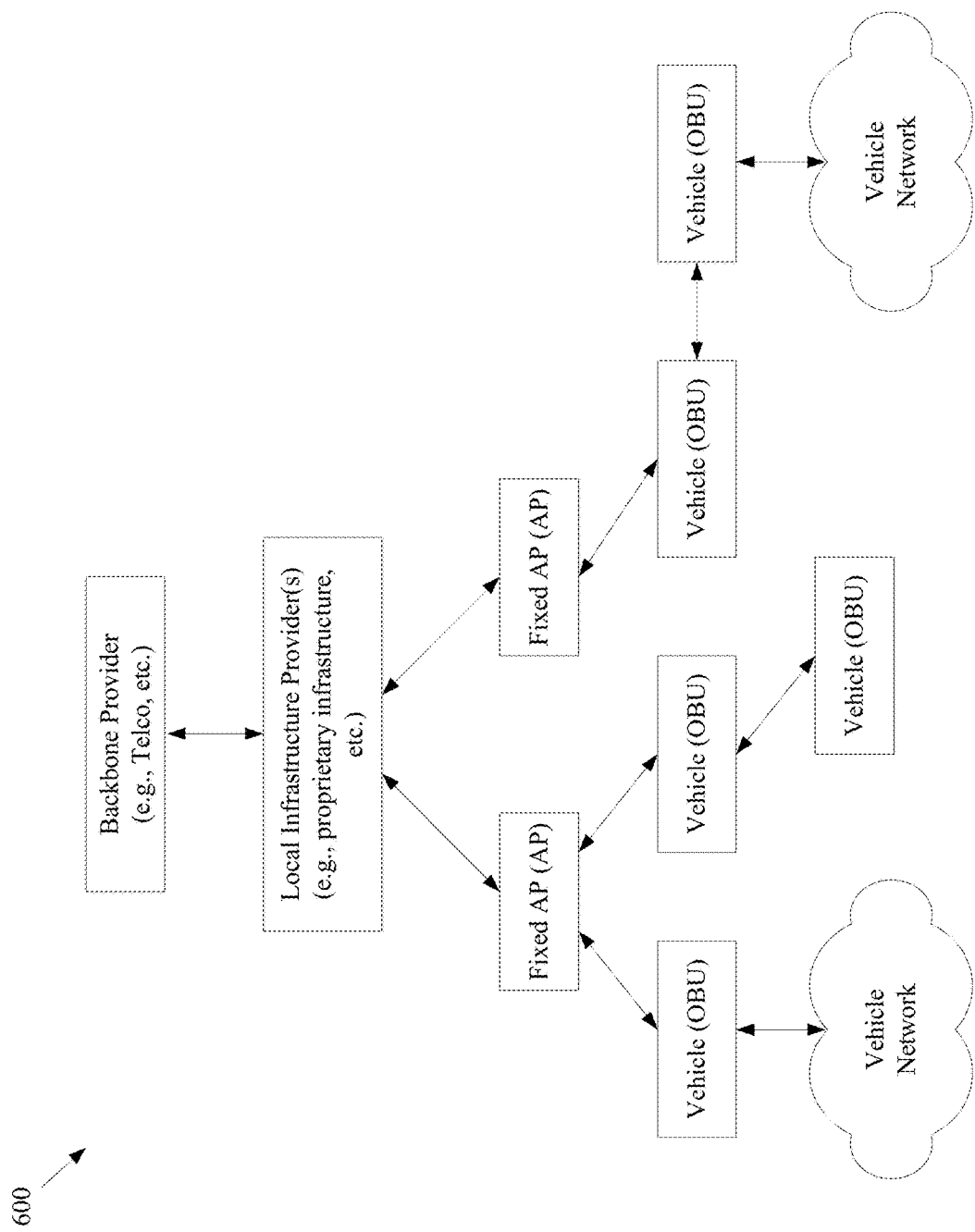
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Within a network of moving things, there exists a dynamic network environment in which the configuration and arrangement of nodes, and the radio frequency environment is constantly changing, which influences the operation of each node of the network, and the way that the nodes communicate with one another. It is expected that nodes/devices of such a network may be constantly changing their physical location, the type of communication connection in use, and the wireless connection technology being employed. The node environment in such a network is always changing, which brings constant variation of the density of nodes in a given geographic area, as well as the number of end-user devices wirelessly connected to each network node. In such a dynamic scenario, nodes of the network may constantly evaluate and adapt their operation methods to best suit the current situation. A number of factors of network operation may change with time and node location.

For example, the communication protocol and communication technology used by nodes of the network may be constantly evaluated and adapted to the communication needs of the node and of the network as a whole including, for example, whether each of the communications between various nodes operates as a delay-tolerant/disruption tolerant network (DTN), or involves real-time communication, and whether the communication protocol and technology in use supports vehicle-to-vehicle (V2V) and/or vehicle-to-infrastructure (V2I) communication. In some situations, nodes of the network may make use of a commercial cellular network. In addition, the nodes of the network may aggregate the bandwidth/capacity available from several different networks using different communication technologies to provide bandwidth needed by the system of the node or services running on the node.

The nodes of a network according to aspects of the present disclosure may adjust the technology specifics for each wired or wireless communication interface of each node including, for example, choosing which communications interface to use for a particular communication link, determining whether to enable or disable particular communications interfaces, and determining whether to, for example, switch the mode of operation of a Wi-Fi-capable wireless communications interface (e.g., IEEE 802.11a/b/g/n/ac/ad/af) able to operate in multiple modes (e.g., as a Wi-Fi Access Point (AP), or a Wi-Fi Station (STA)) or cellular-capable communication interface (e.g., Code Division Multiple Access (CDMA), Global System for Mobile Communication (GSM), 3G, 4G, 5G, Long Term Evolution (LTE), etc.) able to operate in any of the wireless technologies. Technology-specific aspects of wireless communication interfaces of nodes of a network as described herein also include, for example, the communication network to which the node should connect, and any geographic boundaries (e.g., "geographic fences" or "geo-fences") used to define where changes to the various technology-specific operating parameters of communication interfaces of a node are to be made. Adjustments to wireless communication aspects of node operation may be made based on, for example, radio-frequency spectrum regulations, geographic areas or regions in which communication interference is known to be present, and the name(s) of the gateway(s) or access point(s) (i.e., Access Point Name (APN)) linking a mobile cellular network (e.g., Global System for Mobile communication (GSM), General Packet Radio Service (GPRS), 3G, 4G, Code Division Multiple Access (CDMA), Time Division Multiple Access (TDMA), or other cellular network) and another computer network (e.g., frequently the public Internet). In addition, nodes of a network according to aspects of the present disclosure may adjust their primary role or main mode of operation within the network of moving things as a whole including, for example, whether the node acts as an on-board unit (OBU) of a vehicle, an access point (AP) (e.g., a fixed AP), a router, and/or a network controller/mobility controller (NC/MC), depending on the needs and/or status of the network/system, at that moment).

Network nodes in accordance with various aspects of the present disclosure have the ability to choose the best method or mode of operation according to various types of what is referred to herein as "context information." Such context information may include, for example, information about the physical (e.g., radio frequency) and/or network environment (e.g., topology or wider network traffic/loading and equipment issues) surrounding the node. Additional detail of various kinds of context information may be found, for example, in U.S. patent application Ser. No. 15/456,441, titled "Systems and Methods for Managing the Routing and Replication of Data in the Upload Direction in a Network or Moving Things,' filed Mar. 10, 2017; U.S. patent application Ser. No. 15/478,181, titled "Systems and Methods for Managing the Routing and Replication of Data in the Download Direction in a Network or Moving Things,' filed Apr. 3, 2017; U.S. patent application Ser. No. 15/481,732, titled "Systems and Methods for Managing the Scheduling and Prioritizing of Data in a Network of Moving Things,' filed Apr. 7, 2017; and U.S. patent application Ser. No. 15/499,658, titled "Systems and Methods for Managing the Storage and Dropping of Data in a Network or Moving Things,' filed Apr. 27, 2017, the complete subject matter of each of which is here incorporated herein by reference, in its respective entirety. Such context information may be received either from other nodes of the network, or from one or more cloud-based systems (e.g., one or more servers having information about the elements of the entire network/system). The network/system according to various aspects of the present disclosure effectively becomes an organism that reacts and adapts according to internal and external inputs. In this way, the network/system in accordance with aspects of the present disclosure is more scalable and reliable than previous networks/systems, while also ensuring best performance. For example, in a situation in which a particular radio frequency or band of radio frequencies of the wireless network environment surrounding a network node is already crowded, attempts by the node to transmit on that radio frequency or band will only make the RF network environment worse. In such a situation, a node in accordance with aspects of the present disclosure may select another wireless communication technology (e.g., choose to use a cellular network instead of Dedicated Short Range Communication (DSRC)) or select a different radio frequency or band to use (e.g., attempt to employ Wi-Fi at 5 GHz instead of at 2.4 GHz). By collecting context information from its neighbors, the radio frequency environment, and/or one or more cloud-based systems of the network, a node in accordance with aspects of the present disclosure is able to identify potential issues with other nodes of the network (e.g., wireless radio frequency communication issues, or operational problems of the software and/or hardware of neighboring nodes), and may therefore avoid attempting to connect with such potentially problematic nodes. The collection, sharing, and analysis of such context information by nodes of a network as described herein helps to reduce the number of unsuccessful connection attempts or the establishment of impaired connections, and will result in the redirection of requests for the use of shared resources from impaired network nodes to healthy network nodes. By sharing such information with a cloud-based system, network nodes operating as described herein may receive information regarding network conditions for a population of network nodes over a wider geographic area including, for example, the wireless communication technologies that are allowed to operate in a given geographic area, traffic forwarding priorities, network topology (e.g., the availability of network controllers (NCs/MCs), the specific NC/MC that best suits a specific node, and/or the mode in which a particular network node should be operating (e.g., a particular node operating as an AP may choose/be directed to instead operate as an NC/MC, based on current network conditions (e.g., load)).

In accordance with various aspects of the present disclosure, nodes of a network as described herein may have multiple wired network interfaces (e.g., wired/optical network interfaces (e.g., Ethernet, cable, optical fiber, etc.)) and/or wireless network interfaces. Wireless network interface may include, for example, devices/radios for communication using wireless (e.g., radio frequency (RF)) communication technologies such as Wi-Fi, GSM, CDMA, TDMA, 3G, 4G, 5G, LTE, and/or DSRC. A node of a network as described herein may be equipped with one or several wireless network interfaces for each communication technology, or may be re-configurable to operate using a number of different wireless communication technologies (e.g., using software defined radio (SDR) techniques). A node may also be equipped with one or more sensors such as, by way of example and not limitation, a satellite-based geolocation receiver (e.g., a receiver of signals from a Global Navigation Satellite System (GNSS)/Global Positioning System (GPS)); atmospheric pressure, humidity, precipitation, and/or temperature sensors; a sensor of ambient light intensity; one or more sensors for detecting various gases such as oxygen, ozone, oxides of nitrogen, and/or sulfur dioxide; sensors or links to vehicle systems that provide vehicle movement information (e.g., acceleration, speed, heading, lack of movement), and others. According to various aspects of the present disclosure, context information for a node may be gathered from the network interfaces and sensors of the node, from one or more neighbor nodes (e.g., nodes that are within wireless communication range of a first node), and from one or more cloud-based system(s). Such context information for a particular node (e.g., RF environment, physical environment, etc.) may be used by the particular node to choose a new primary or main configuration or operating mode of the particular node that may be different from the current primary or main configuration of the particular node, where the new configuration or operating mode is one that may best suit the particular node in the current context of the geographic area, the network environment of the particular node, and the overall network/ system as described herein.

For example, a number of different types of network nodes are described above including, for example, a fixed access point (i.e., fixed AP (FAP), which may also be referred to herein as a road-side unit (RSU)), a mobile access point (i.e., mobile AP (MAP), which may also be referred to herein as an on-board unit (OBU)), and a network controller (NC)/mobility controller (MC). By way of illustration and not limitation, the primary or main mode of operation of a FAP/RSU in accordance with the present disclosure may be described as a node that is located at a fixed geographic location, that is equipped with a high-bandwidth backhaul connection (e.g., wired or wireless; radio frequency, optical, or coaxial cable or other wire) that enables wireless access for real-time Internet or other access, and that enables offload of stored data from mobile nodes operating as delay-tolerant/disruption tolerant carriers of data. In contrast, the primary or main mode of operation of a MAP/OBU in accordance with the present disclosure may be described as a node that acts as a mobile (e.g., vehicle resident) point of real-time and delay-tolerant wireless network access for end-user devices (e.g., smart phones, tablet computers, laptop computers) and various types of sensors (e.g., environmental, vehicle, etc.), and that wirelessly or physically transfers data from sensors, end-user devices, and other MAPs, for delivery to another MAP or a FAP/RSU. The primary or main mode of operation of a network controller (NC)/mobility controller (MC) in accordance with aspects of the present disclosure may be described as a node that provides and manages connections between one or more third party networks (e.g., the Internet) and the nodes of a network of moving things as described herein (e.g., mobile nodes (e.g., MAPs/OBUs), end-user devices connected to mobile nodes, and sensors). As can be seen above, the primary or main operating mode of the FAP/RSU, MAP/ OBU, and NC/MC of the present disclosure may be quite different, and some types of nodes of a network in accordance with the present disclosure such as, for example, a MAP/OBU, may change their primary or main operating mode to act as another type of network node such as, for example, a FAP/RSU, while a FAP/RSU may, for example, change its primary or main operating mode to act as an NC/MC, according to the physical, wireless, environmental, and network context information of the nodes of a network of moving things as described herein. It should be noted that the actions of the main or primary modes of operation of the types of nodes of a network according to the present disclosure shown above are provided by way of illustration, and are not intended to be limiting, as other actions may be part of operation of the type of nodes discussed herein.

Figure 7:
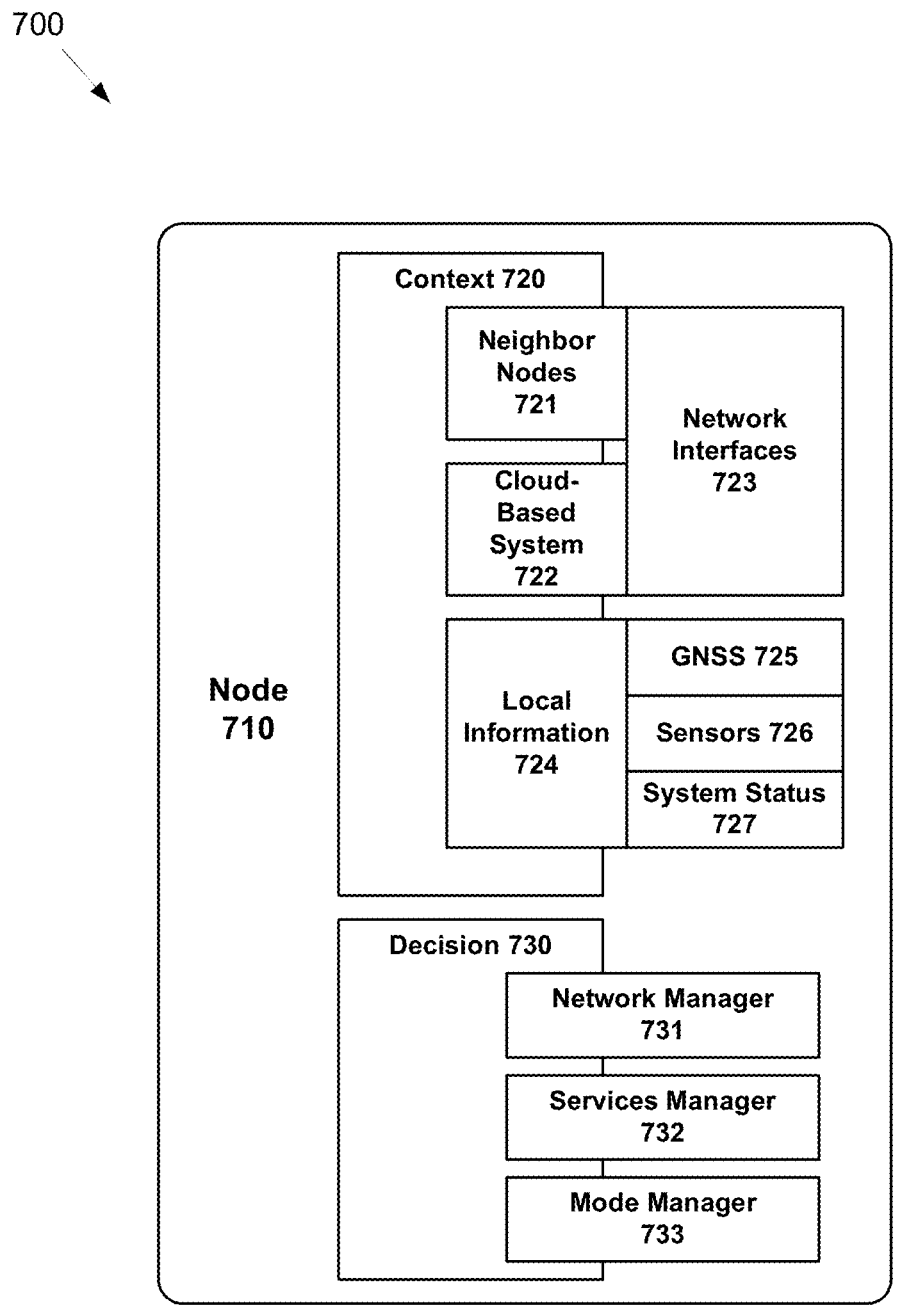
FIG. 7 is a block diagram illustrating a set of functional modules that may be present on a node of a network of moving things, in accordance with various aspects of the present disclosure.

FIG. 7 is a block diagram illustrating a set of functional modules that may be present on a node 710 of a network of moving things, in accordance with various aspects of the present disclosure. As illustrated in the example of FIG. 7, the node 710 comprises a context module 720 and a decision module 730, which may be embodied in the form of software (e.g., instructions executable by one or more processors), circuitry (e.g., analog circuitry, digital circuitry, or a combination of analog and digital circuitry), or a combination of software and circuitry. The context module 720 enables the node 710 to gather information from the physical (e.g., geographic location (latitude/longitude), temperature, speed/velocity, acceleration, atmospheric characteristics, etc.) and/or network (e.g., radio frequency wireless characteristics, connectivity, node density, etc.) environment surrounding the node 710, and therefore to better determine the most appropriate operation method to apply to the node 710 in each scenario.

The particular example network node 710, in accordance with aspects of the present disclosure, may have a context module 720 that gathers context information from neighbor nodes 721 (i.e., nodes with which the node is able to communicate (e.g., within wireless communication range)) including, for example, road-side units/fixed access points (RSUs/FAPs), and on-board units/mobile access points (OBUs/MAPs), using network interfaces 723 with which the particular node is equipped. Such context information gathered by the context module 720 may include, by way of example and not limitation, the number and/or type of each end-user device currently connected (e.g., using RF wireless links) to the neighbor node, the type of communication technology in use or available for use at the neighbor node, the density of nodes in the area surrounding the node 710, various characteristics (e.g., received signal strength (RSSI), signal-to-noise ratio (SNR), RF frequency, bit rate, coding, etc.) of signals received from neighboring nodes, etc. Using the available communication connections, the particular node 710 may also receive updates of context information for one or more cloud-based systems 722 regarding current status of the network and/or network policies and priorities, to enable the particular node 710 to not only decide what to do based on the situation of the particular node 710, but to also take into account the management of the various nodes and connections of the network as a whole, or particular other portions of the network (e.g., the network may have certain policies for some areas of the network regarding use of particular communication technologies (e.g., Wi-Fi, DSRC, cellular), due to interference of the particular communication technology with equipment in that area).

In accordance with various aspects of the present disclosure, the node 710 may also store local context information 724 received from, for example, a GNSS/GPS receiver 725 (e.g., node location, node speed, node local time), received from sensors 726 of the node 710, or from sensors that sense properties of the area surrounding the node 710 (e.g., from system(s) of a vehicle/autonomous vehicle in which node 710 resides, or sensors of the environment around the node 710). The context information stored by the context module 720, including the local context information 724, may be considered to be, or may include, historical data about the behavior of node 710. In addition, the local context information 724 may comprise system status information 727 that may include, for example, available system resources and status of the node (e.g., CPU type and current computing load/usage, types of data storage/memory and respective capacity, other storage and capacity, etc., current operating mode of the node (e.g., normal, emergency/critical, standby/ offline, idle).

The particular example network node 710, in accordance with various aspects of the present disclosure, may have a decision module 730 that selects the most appropriate primary or main operation mode for the network node 710, based on the context information gathered by the context module 720. The example decision module 730 of FIG. 7 comprises a network manager 731, a services manager 732, and a mode manager 733, which may use the collected context information gathered by the context module 720, as described above, to select the most appropriate operation mode in regard to, for example, network management, services management, and operation mode management, respectively.

A network manager in accordance with aspects of the present disclosure, such as the network manager 731 of FIG. 7, may perform various analyses, determinations, adjustments, and/or adaptations of components, parameters, and/or configurations of a node such as the node 710 of FIG. 7 that are related to communication of information using the network described herein. The example network manager 731 may be responsible for the management of software components and/or subsystems; electrical components and/or subsystems; and physical components and/or subsystems that impact the wired and/or wireless connectivity of the node 710 with other nodes/elements of a network of moving things as described herein. A few examples of actions that may be taken by a network manager according to aspects of the present disclosure include, but are not limited to, enabling/disabling/configuring the communication technology and parameters of any of the network interfaces 723 of the node 710, enabling and/or blocking multi-hop network connections, adjusting/adapting the transmit signal power of wireless network interfaces, and/or enabling/disabling/configuring one or more Wi-Fi networks/connections supported by the network node 710. In addition, responsibilities of a network manager according to aspects of the present disclosure (e.g., network manager 731) may include, but are not limited to, selection of communication interfaces/connections with which to perform link aggregation that enables faster data offloading; connection throughput throttling, and traffic prioritization management.

A services manager in accordance with aspects of the present disclosure, such as the services manager 732 of FIG. 7, may perform various analyses, determinations, adjustments, and/or adaptations of components, parameters, and configuration of a node such as the node 710 of FIG. 7 that are related to services that are supported by the node 710. The example services manager 732 may be responsible for the management: of software components and/or subsystems; electrical components and/or subsystems; and physical components and/or subsystems that impact the services provided by the node 710 or any neighbor node of a network as described herein. A few example actions that may be taken by a services manager according to aspects of the present disclosure include, but are not limited to, enabling/disabling/configuring service announcement (e.g. announcement of services such as providing a connection to the Internet, offloading of DTN data, and the caching of local content); and adapting a configuration of, for example, Wi-Fi service to enable operation according to a desired method including, for example, creating a local private network or extending an existing network provided by a node such as, for example, the node 710.

Other example services that may be under the control of a services manager (e.g., services manager 732) may include, for example, a Wi-Fi scanning service that maps Wi-Fi signal sources along a route of travel of a network node 710 that is mobile (e.g., OBU/MAP), and a data harvesting service that operates to collect sensor data from sensors in wireless proximity to the movement of mobile network nodes such as, by way of example and not limitation, sensors associated with garbage containers along roads where OBU-equipped vehicles travel. Data from such sensors may be captured and forwarded to a department within a municipality that may use such sensor date to know when to dispatch empty garbage containers to replace those garbage container that are full.

The phrase "offload of DTN data" as used herein refers to a general mechanism that may be used to offload data harvested by OBUs/MAPs (e.g., as described above), which does not need to be transmitted immediately to a destination (i.e., use of the data is delay-tolerant). In such situations, an OBU/MAP may cache the data and may send the cached data only when the OBU/MAP is able to transmit the data to a destination through a low cost communication technology (e.g., DSRC or Wi-Fi), or after some maximum amount of delivery delay has transpired. For example, passenger data communication information and road traffic metrics that may be collected by OBUs/MAPs during the travels of an OBU-equipped vehicle along the roads and highways may be collected for analysis, to evaluate the usage of the data communication service of the vehicle and vehicle traffic. However, such information may not be needed by a consumer/user of the data, right away (i.e., use of the data is delay-tolerant), and it may be acceptable to analyze such data at some later point in time.

The concept of "caching local of content," mentioned above, refers to the ability of a node (e.g., an OBU/MAP and/or RSU/FAP) to download and store digital content for later distribution (e.g., from a server) to users of such digital content. For example, video content that many users may need to view to enable them to connect to the Internet, may be downloaded from a distant source just once, and may then be cached on a local network node (e.g., an OBU/MAP and/or RSU/FAP). The content may then be provided by the local network node to users when needed. It is not necessary to download such content from the distant source each time such content is needed by a user within communication range of a network node on which the desired content is cached.

The term "service announcement" may be used herein to refer to the act, by a given network node, of letting other network nodes know that the given node is available for others to connect to. For example, in the case of a node supporting a Wi-Fi (e.g., IEEE 802.11a/b/g/n/a/ac/ad/af) access point, "service announcement" may establish a Wi-Fi network with certain characteristics that other network nodes (e.g., OBUs/MAPs and/or RSUs/FAPs) are looking for, so that those other network nodes may recognize and connect to each other. In the case of a network node that is equipped to support DSRC (e.g., IEEE 802.11p) compliant wireless communication, the node may have a beacon that may be used to advertise or announce the presence of that network node to other nodes within wireless communication range. In such an arrangement, the network node may share information about the network node (e.g., one or more node identifiers and/or a customizable string of data (e.g., "PSC") that may be used for sharing information such as, for example, node health status, so that nodes that are nearby (e.g., "neighbor nodes" that are within wireless communication range) can easily identify whether the network node is or is not a good candidate to which to connect.

A mode manager in accordance with aspects of the present disclosure, such as the mode manager 733 of FIG. 7, may perform various analyses, determinations, adjustments, and/or adaptations of components, parameters, and/or configuration of a node such as the node 710 of FIG. 7 that are related to election/selection of the functional/operational mode of the node 710, using some or all of the information coming from the system(s) of the node 710. A few examples of actions that may be taken by a mode manager according to aspects of the present disclosure include, but are not limited to, those based on overall resources and status. For example, a node unable to run as it is supposed to (e.g., unable to successfully complete the various operations that it is programmed to perform) may switch to an "Idle" mode. By way of example and not limitation, this may occur when the node is at a location outside of a defined area of service (e.g., defined by a "geo-fence"), when one or more system(s) of the node are experiencing a level of load (e.g., CPU, network communication, etc.), when the node is located in a geographic area where the node is experiencing high levels of radio frequency interference, when the node is unable to move to its destination (e.g., an autonomous vehicle, due to traffic or low battery capacity), etc.

FIGS. 8A-8C are high-level block diagrams illustrating an example change of operational mode of a node of a network, in accordance with various aspects of the present disclosure. The network elements of FIGS. 8A-8C (e.g., access points (APs) such as Wi-Fi and/or mobile APs) may correspond to, for example, the APs discussed above with respect to the networks 100, 200, 300, 400, 500, and 600 of FIGS. 1-6.

The illustration of FIG. 8A shows mobile AP MAP1 804A communicating with a Wi-Fi AP 802 using, for example, a radio frequency link according to any of the Wi-Fi technical recommendations including, by way of example and not limitation, IEEE 802.11a/b/g/n/ac/ad/af. In the example of FIG. 8A, the mobile AP MAP1 804A may operate simply as a mobile AP, and may not take its wireless context into account in regard to the operating mode of AP MAP1 804A. The mobile AP MAP1 804A may also not take into account the presence of neighbor nodes shown in FIG. 8A as additional illustrated mobile APs MAP2 806A and MAP3 808A, which may or may not be within wireless communication range of the Wi-Fi AP 802. In this situation, the mobile APs MAP2 806A and MAP3 808A may choose to communicate using, for example, a commercial cellular or other wireless communication technology, which may have a higher communication cost than access via the Wi-Fi AP 802.

The illustration of FIG. 8B shows an example situation in which the mobile AP MAP1 804A of FIG. 8A chooses, based on an evaluation of wireless context information of MAP1 804A, to change operating mode and to act as a fixed AP, MAP1/FAP1 804B, in accordance with aspects of the present disclosure. Within a particular context having corresponding context information (e.g., that the mobile AP MAP1 804B has a Wi-Fi communication link available and that there are neighbor nodes present that may use such a backhaul link), a mobile AP in accordance with aspects of the present disclosure may choose to change its operating mode and, as illustrated in the example of FIG. 8B, may announce itself as a fixed AP, MAP1/FAP1 804B, in order to encourage other MAPs (e.g., MAP2 806B, MAP3 808B) to connect through the MAP1/FAP1 804B. Such a connection may, for example, be established without certain restrictions that may apply otherwise (e.g., without a maximum number of node-to-node hops, without a particular required minimum RSSI to establish a wireless link, etc). As shown in FIG. 8B, the MAP1/FAP1 804B enables MAP2 806B to connect with the MAP1/FAP1 804B using the DSRC communication technology (e.g., IEEE 802.11p). Also as shown in FIG. 8B, the MAP3 808B may be enabled to connect, using DSRC, through MAP2 806B to Wi-Fi AP 802. The situation shown in FIG. 8B may occur when, for example, a vehicle in which the mobile AP (e.g., MAP1 804A of FIG. 8A) is located, stops near a Wi-Fi hotspot (e.g., Wi-Fi AP 802 may be located near/in a parking lot, at a traffic light, or near a charging/parking slot for an electric and/or autonomous vehicle). In such a situation, the mobile AP MAP1 804B may determine that it has a stable backhaul path to other networks (i.e., via Wi-Fi AP 802) having a low cost of data transport and high available bandwidth. This creates a good scenario in which a mobile AP (e.g., MAP1 804A of FIG. 8A) may choose to change the operating mode of the mobile AP and announce itself, e.g., via wireless interfaces of the mobile AP, as a fixed AP (e.g., MAP1/FAP1 804B) to the other mobile APs (e.g., MAP2 806B, MAP3 808B).

The illustration of FIG. 8C shows another example situation in which the mobile AP MAP1 804A of FIG. 8A may choose, based on an evaluation of wireless context information of MAP1 804A, to change its operating mode and to act as a fixed AP, MAP1/FAP1 804C, in accordance with aspects of the present disclosure. The example of FIG. 8C is similar to that of FIG. 8B. Again, within a particular context having corresponding context information (e.g., the availability of a Wi-Fi communication link for backhaul), a mobile AP in accordance with aspects of the present disclosure may choose to change its operating mode (e.g., changing between modes of operation such as fixed AP, mobile AP, MC/NC, etc.) and, as illustrated in the example of FIG. 8C, may announce itself as a fixed AP, MAP1/FAP1 804C, which may encourage other MAPs (e.g., MAP2 806C, MAP3 808C) to connect through the MAP1/FAP1 804C. In the example of FIG. 8C, the MAP1/FAP1 804C may, in accordance with some aspects of the present disclosure, choose to use one or more wireless network interfaces with which it is equipped to provide service as a Wi-Fi access point to mobile AP MAP2 806C. In accordance with alternative aspects of the present disclosure, the mobile MAP1/FAP1 804C may also provide a DSRC link, as in FIG. 8B, enabling neighboring nodes to choose between a Wi-Fi connection and a DSRC connection. As shown in the example of FIG. 8C, the mobile AP MAP2 806C may, in accordance with context information available to mobile AP MAP2 806C, make a DSRC connection available to mobile AP MAP3 808C. In such a situation, the DSRC point of access provided by the MAP1/FAP1 804C or the mobile AP MAP2 806C may provide a greater range of coverage than the Wi-Fi coverage area provided by the MAP1/FAP1 804C, which will enhance the capacity of a network according to the present disclosure, and enable more efficient data offload and avoidance of the use of commercial cellular network(s).

Figure 9A:
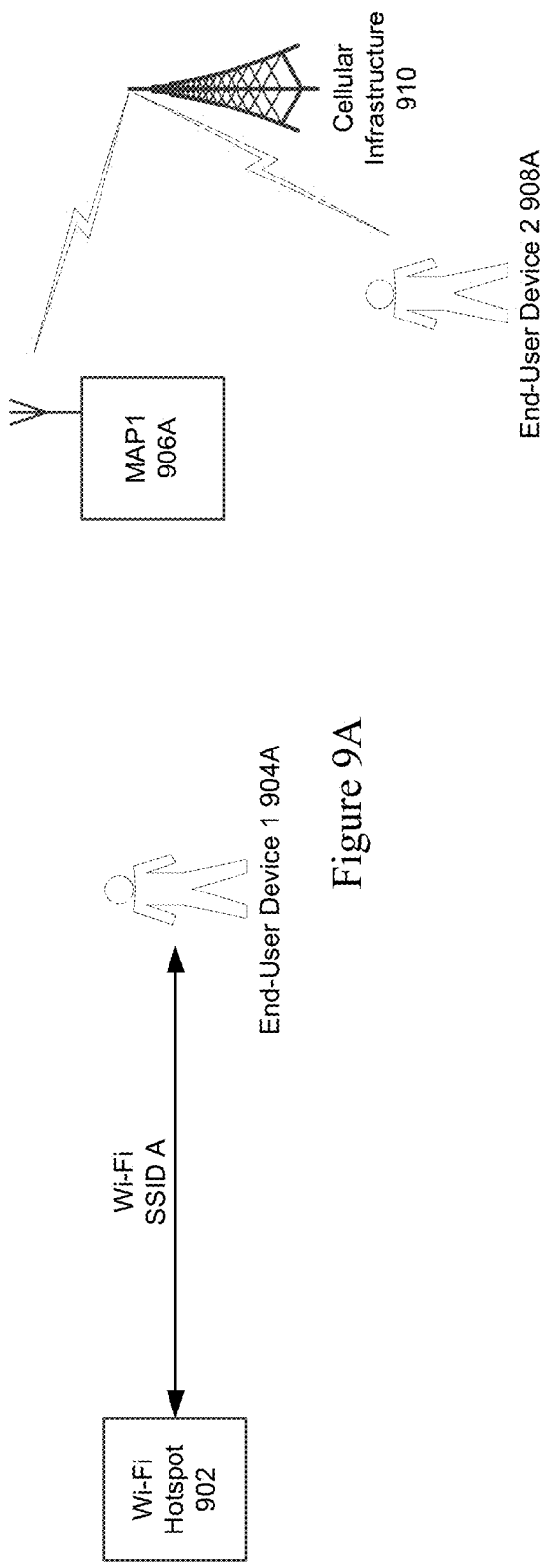
FIGS. 9A-9C are illustrations of high-level block diagrams showing a further example of a change of operational mode of a node of a network, in accordance with various aspects of the present disclosure.
Figure 9B:
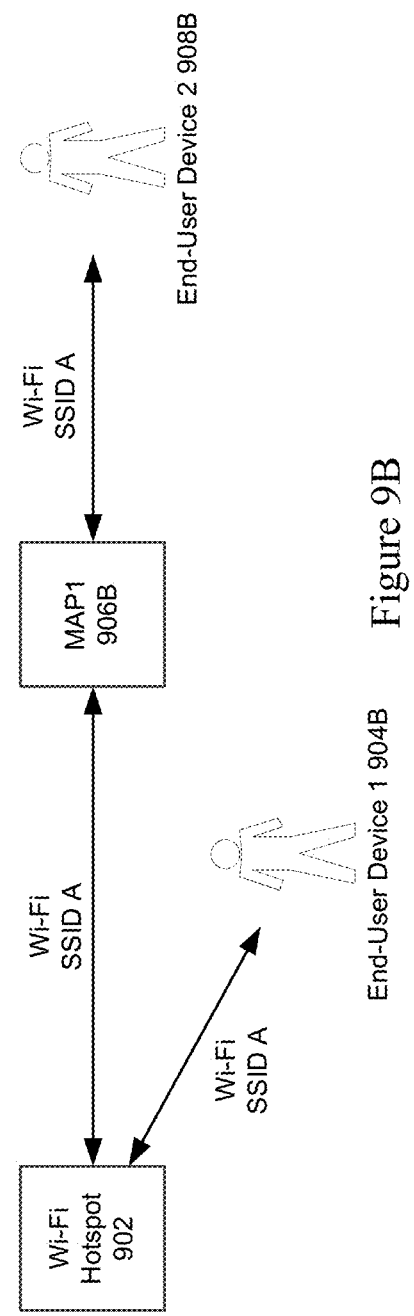
Figure 9C:
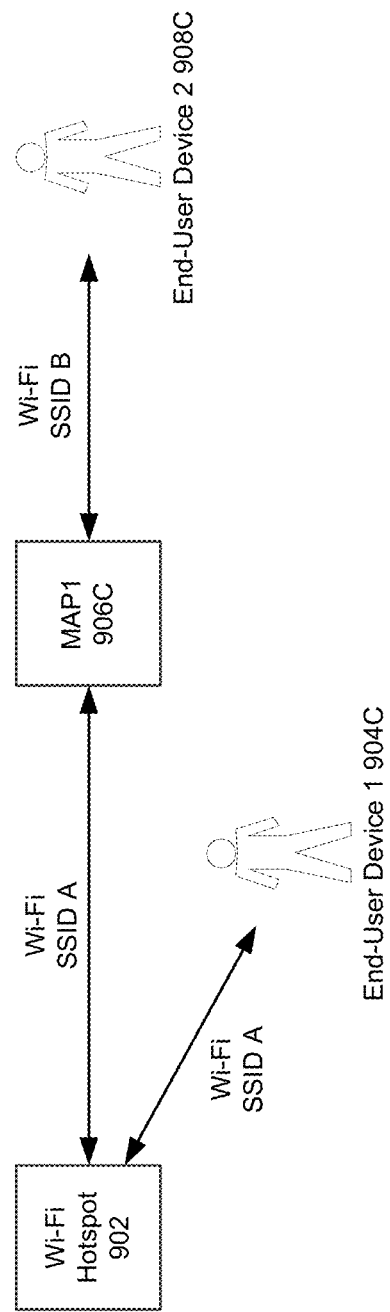

FIGS. 9A-9C are illustrations of high-level block diagrams showing a further example of a change of operational mode of a node of a network, in accordance with various aspects of the present disclosure. The network elements of FIGS. 9A-9C (e.g., access points (APs) such as Wi-Fi Hotspots (APs) and/or mobile APs) may correspond to, for example, the APs discussed above with respect to the networks 100, 200, 300, 400, 500, 600, and 800 of FIGS. 1-6 and 8A-8C. The following discussion of FIGS. 9A-9C may make reference to the elements of any of FIGS. 1-8C.

The illustration of FIG. 9A shows an End-User Device 1 904A communicating with a Wi-Fi Hotspot (AP) 902 using, for example, a radio frequency link according to any of the wireless local area network (WLAN) (e.g., Wi-Fi) technical recommendations including, by way of example and not limitation, IEEE 802.11a/b/g/n/ac/ad/af. In FIG. 9A, only the End-User Device 1 904A, that is within range of the Wi-Fi Hotspot 902, may receive data service from the Wi-Fi Hotspot 902. The remaining End-User Device 2 908A and mobile AP1 906A that are out of range of the Wi-Fi Hotspot 902, may need to use another wireless technology (e.g., commercial cellular infrastructure 910) to support their data needs.

The illustration of FIG. 9B shows an example situation in which a mobile AP (e.g., MAP1 906B) chooses, based on an evaluation of wireless context information of MAP1 906B, to modify the primary or main operating mode of the MAP1 906B, by connecting to a Wi-Fi AP (e.g., a road-side Wi-Fi Hotspot 902) broadcasting a Wi-Fi Service Set Identifier (SSID) "SSID A," and to extend the coverage area of the Wi-Fi AP (e.g., Wi-Fi Hotspot 902) by re-transmitting the information received from Wi-Fi Hotspot 902 by MAP1 906B (and by End-User Device 1 904B), including the "SSID A," to the End-User Device 2 908B and any other devices within range of the mobile AP MAP1 906B. The wireless context information of the mobile AP MAP1 906B may include, by way of example and not limitation, detection of the presence of and signal characteristics of the Wi-Fi Hotspot 902 and similarly of the End-User Device 2 908B. Following a change in the operating mode of the mobile AP MAP1 906B, the information content of any Wi-Fi transmissions from the Wi-Fi Hotspot 902 received by the mobile AP MAP1 908B may be re-transmitted to the End-User Device 2 908B (using "SSID A"), and the information content of any Wi-Fi transmissions from the End-User Device 2 908B (using "SSID A") received by mobile AP MAP1 906B may then be re-transmitted to the Wi-Fi Hotspot 902. The operation of the network elements shown in FIG. 9B may not involve any additional processing in the mobile AP MAP1 906B or any additional network integration. The above mechanism operates in a transparent fashion, and any SSID/authentication mechanisms/captive portals in use may operate in their normal fashion (i.e., as they did prior to the presence of mobile AP MAP1 906B). In this manner, the mobile AP MAP1 906B may be used to extend Wi-Fi hotspots in a transparent way for the end-users within the coverage area served by the MAP1 906B.

The illustration of FIG. 9C shows an example situation in which a mobile AP (e.g., MAP1 906C) autonomously chooses, based on an evaluation of wireless context information of MAP1 906C, to modify the operating mode of the MAP1 906C by connecting to a Wi-Fi AP (e.g., a road-side Wi-Fi Hotspot 902) broadcasting a Wi-Fi Service Set Identifier (SSID) of "SSID A," and to extend the coverage area of the Wi-Fi Hotspot 902 by re-transmitting the information received from Wi-Fi Hotspot 902 by MAP1 906C (and End-User Device 1 904C), using an "SSID A," to the End-User Device 2 908C and any other devices within range of the mobile AP MAP1 906C. The wireless context information of the mobile AP MAP1 906C may include, by way of example and not limitation, detection of the presence of and various signal characteristics of the Wi-Fi Hotspot 902 and of the End-User Device 2 908C. Following the change in the operating mode of the mobile AP MAP1 906C, the information content of any Wi-Fi transmissions from the Wi-Fi Hotspot 902 using "SSID A" received by the mobile AP MAP1 906C may be re-transmitted to the End-User Device 2 908C using "SSID B", and the information content of any Wi-Fi transmissions from the End-User Device 2 908C using "SSID B" received by mobile AP MAP1 906C may then be re-transmitted to the Wi-Fi Hotspot 902 using "SSID A." In this manner, the mobile AP MAP1 906C extends the Wi-Fi coverage area of the Wi-Fi Hotspot 902, and isolates clients (e.g., end-user devices) connected through the MAP1 906C from the clients (e.g., end-user devices) connected directly to the Wi-Fi Hotspot 902. The operation of the network elements shown in FIG. 9C need not involve any additional network integration, but may be the same if desired. In this manner, the mobile AP MAP1 906C may be used to extend Wi-Fi hotspots for the end-users within the coverage area served by the MAP1 906C.

In accordance with various aspects of the present disclosure, access points (e.g., mobile APs) may choose not to use (or not to "announce" availability of) one or more wireless network interfaces for particular communication technologies, based on context information for the radio frequency environment. For example, a first OBU may allow other nodes (e.g., other OBUs) to connect to the first OBU using DSRC, but not using Wi-Fi. In such a situation, the first OBU simply does not "announce" availability of access through the Wi-Fi interface. For example, an access point may choose to not use DSRC, or to not use Wi-Fi, or to not use any other wireless communication technology due to unacceptable network conditions (e.g., measurements of one or more certain network characteristics below one or more respective minimum thresholds regarding respective quality measurements (e.g., RSSI, signal-to-noise ratio, bit error rate, delay spread, etc.)), or any other reasons. In accordance with aspects of the present disclosure, an access point (e.g., a network controller of a node acting as a fixed or mobile AP, such as the network controller 731 of node 710) may choose to disable (e.g., "kill") network interfaces (e.g., any of network interfaces 723) for wireless communication links of the access point, based on the RF environment of the node. For example, the network interfaces of the node may be using two or more different wireless communication technologies (e.g., DSRC, Wi-Fi, Bluetooth, cellular, etc., as described herein), and wireless context information for the network interfaces of the access point may indicate that a level of interference or a measurement of path quality experienced by one or more of the communication technologies supported by the network interfaces of the node (e.g., caused by the density of nodes attempting to use the selected communication technologies, the amount of message traffic, the RF environment, etc.) has risen/fallen to an unacceptable level or threshold, which may be specific to each wireless communication technology in use. A network controller in accordance with aspects of the present disclosure (e.g., network controller 733) may, for example, disable and re-enable the network interfaces of a node based on network conditions collected and stored as network context information (e.g., context information 720).

In accordance with various aspects of the present disclosure, nodes of a network of moving things as described herein may operate in an operating mode autonomously selected by each node based on policies/rules managed and/or distributed to nodes by a cloud-based system. Such policies/rules may be defined in configuration information distributed by the cloud-based system to the nodes of the network. Additional information about an example system and method for the distribution of configuration information may be found in U.S. patent application Ser. No. 15/138, 370, titled "Systems and Method for Remote Configuration Update and Distribution in a Network of Moving Things," filed Apr. 26, 2016, the complete subject matter of which is hereby incorporated herein by reference, in its entirety. By way of example and not limitation, nodes (e.g., fixed APs and/or mobile APs) of a network of moving things according to aspects of the present disclosure may support an operating mode that may be referred to herein as a "fence mode," such that within certain geographic areas, (e.g., defined by corresponding "geo-fences"), a node may only operate using one or more certain wireless communication technologies that are permitted to be used (e.g., cellular-only zones, Wi-Fi-only zones, DSRC-only zones, etc.), or that while in other specific geographic areas, the use of certain wireless communication technologies (e.g., DSRC-forbidden zones, Wi-Fi-forbidden zones, cellular-forbidden zones, etc.) may not be permitted. Geographic areas may, for example, also be defined within which a node may not perform a change in its primary or main operating mode as discussed above. Additional geographic areas or zones may also be defined within which a node may not allow "multi-hop" communication, such as zones in which highly-unstable connections may be formed when used to support multi-hop communication.

In accordance with various aspects of the present disclosure, nodes of a network of moving things as described herein may autonomously make operating mode decisions based on network demands and current node conditions. For example, if communication, processing, memory, or other loads upon a first network node rise above one or more defined thresholds, or if the first network node becomes non-responsive, one or more other nodes of the network may autonomously change their own main or primary operating mode(s), so that the one or more other network node(s) provide functionality equivalent to the first node. In accordance with aspects of the present disclosure, two or more network nodes other than the first network node may cooperate to elect the network nodes that are to switch their main or primary operating mode to replace/augment the functionality of the first network node. Certain nodes of the network may be more suitable for acting in the role of a replacement/ assistant node for the first node, due to the type of supported communication technologies/network interfaces (e.g., wireless vs. wired, type of communication technologies available, etc.), the source of the power from which they operate (e.g., mains power, battery power, vehicle battery power, alternate power technology (e.g., wind, solar, etc.)). Such considerations may be taken into account when election(s)/ selection(s) of one or more alternate node(s) that will change operating mode is/are made. As noted here, one or more replacement/assistant nodes may be elected/selected from the nodes of the network, and such election/selection may, for example, be based on node geographic location (e.g., latitude/longitude) within the coverage area of the network, in order to provide the needed functionality where the need for the functionality is currently, or has historically been present. In accordance with aspects of the present disclosure, when a replacement/assistant node is elected/selected to operate according to a new operating mode, an amount of time for which the elected/selected node(s) will operate in the new operating mode may be specified, and may be announced to other nodes of the network. It should be noted that the election/selection of nodes of the network that are to change their primary or main operating mode may be performed autonomously by each node, by a cooperative election/selection process among the nodes, by a cloud-based system, and/or by a combination of these approaches.

By extending the range of low-cost communication technologies through the use of network nodes (e.g., fixed and/or mobile gateways) operating in accordance with various aspects of the present disclosure, a network operating as described herein provides a much more cost-efficient offload of data traffic and various network loads, while enabling the end-user to enjoy more widely available access to the best possible features of communication technologies including, for example, reduced latency and increased throughput. By adapting their main or primary operating mode according to context information gathered from, for example, the surrounding wireless, physical, and/or network environments, the nodes of a network operating according to aspects of the present disclosure have an improved likelihood of experiencing the best network connection possible, while reducing the likelihood of damaging connections to other nodes of the network. In this manner, nodes of a network operating as described herein may avoid high network congestion and/or RF interference, while sharing low-cost backhaul communication links of access points several hops away, to increase the total range and bandwidth available to nodes of the network. The approach described herein also reduces operational and maintenance costs of operating a network, as specific/additional devices (e.g., additional mobile APs/ fixed APs) need not be allocated/installed in the network as backup nodes, because existing nodes of the network are able to change their main or primary operating mode to permit those nodes to provide the same functionalities provided by network elements that experience occasional situations of failure or congestion. As one example, mobile APs located in autonomous vehicles may automatically relocate to areas of network congestion or overload to act as "fixed" APs of a dense mesh, thereby providing additional network capacity on a temporary basis, when needed, based on node and network context information.

FIGS. 10A-10D are a flowchart 1000 illustrating an example method for operating a network node supporting node reconfiguration and change of primary operating mode of operation, role, or capacity, in accordance with various aspects of the present disclosure. The terms "primary mode of operation," "role," or "capacity" of a network node may be used herein to refer to the function assumed or part played by the network node in a particular situation (e.g., fixed AP (FAP), mobile AP (MAP), mobility controller (MC)/network controller (NC), etc.). The actions of the method of FIGS. 10A-10D may be performed by some or all of the nodes of the network of moving things discussed herein. The method of FIGS. 10A-10D begins at block 1002 of FIG. 10A.

At block 1002, the node performing the method of FIGS. 10A-10D may receive configuration information for operation in a network according to the present disclosure. Such a network may comprise two or more types of nodes that are not interchangeable, where each type of node has a respective primary mode of operation or role. While some of the nodes described herein are examples of such nodes including, for example, a fixed AP, a mobile AP, and a NC/MC, aspects of the present disclosure are not limited to only those types of nodes. Next, at block 1004, the method may configure the node performing the method for a primary operating mode indicated by the received configuration information, and may then begin operation of node in that primary mode of operation or role.

At block 1006, the method may determine whether the primary operating mode or role of the node performing the method is for a node of an example first type of node in the network. If the primary operating mode of the node is not the primary operating mode for a node of the first type, the method may continue at block 1020 of FIG. 10B, discussed below. If, however, the primary operating mode of the node is the primary operating mode for a node of the first type, the method may continue at block 1008, where the method may analyze context information for the node. As described above, nodes of a network as described herein may each collect information about their context such as, for example, their wireless network context (e.g., RF signal environment (e.g., strength(s) of received signal(s), communication technologies of received signals, etc.), their overall network context (e.g., information about the number and identity of the neighboring nodes, the identity of their assigned NC/MC, etc.), their context within their physical environment (e.g., geographic location (e.g., latitude/longitude), speed, heading, whether the node is stopped or moving, etc.), and other information, as described herein.

Next, at block 1010, the method may determine whether the current node context information meets the conditions required for a change of the primary operating mode or role of the node to the a new primary operating mode or role of a node of a second type. For example, in accordance with various aspects of the present disclosure, a mobile AP or OBU performing the method of FIGS. 10A-10D may determine that its current context information indicates that the node is physical stopped (i.e., stationary), that the node currently has a large number of end-user devices connected to the Wi-Fi access point that the MAP/OBU uses to provide Wi-Fi to riders of the vehicle in which the node is installed, and that access to a network (e.g., a Wi-Fi hotspot) supporting a high-bandwidth connection is within wireless communication range of the node. Those conditions may, for example, meet the requirements for the node to make a change of primary operating mode or role to the primary operating mode or role of a second type of network node, namely, a fixed access point (e.g., FAP or RSU). If, at block 1010, the method determines that the node context information does not meet the context conditions for a change of the primary operating mode or role of the node to the primary operating mode or role of a node of the second type, the method may then continue at block 1020 of FIG. 10B, discussed below. If, however, the method determines, at block 1010, that the node context information meets the context conditions for a change of the primary operating mode or role of the node to the primary operating mode or of a node of the second type, the method may then continue at block 1012.

At block 1012, the example method may change the primary operating mode or role of the node to be the primary operating mode or role of a node of the second type of node. By way of example and not limitation, in accordance with various aspects of the present disclosure, a mobile AP or OBU may change its primary operating mode or role to that of a fixed AP or RSU. Next, at block 1014 of FIG. 10B, the node may adjust the configuration (e.g., software, electrical hardware, etc.) of the node to operate as a node of the second type. For example, a mobile AP or OBU according to the present disclosure may configure the operation of a wireless (e.g., Wi-Fi) capable network interface to act as a station (STA) compatible with a high-bandwidth Wi-Fi hotspot, and may adjust the configuration of one or more other network interface(s) of the node to act as Wi-Fi access point(s) compatible with end-user devices on the vehicle in which the mobile AP/OBU is installed. Then, at block 1016, the method may notify other nodes of the network (e.g., using any wireless interface of the node) of the change in the primary operating mode or role of the node, so that they are aware of the change of operating mode or role of the node, and at block 1018, the method may begin operation of the node in the new primary operating mode or role as a node of the second type of node (e.g., FAP/RSU). The method then continues to block 1020.

Figure 10A:
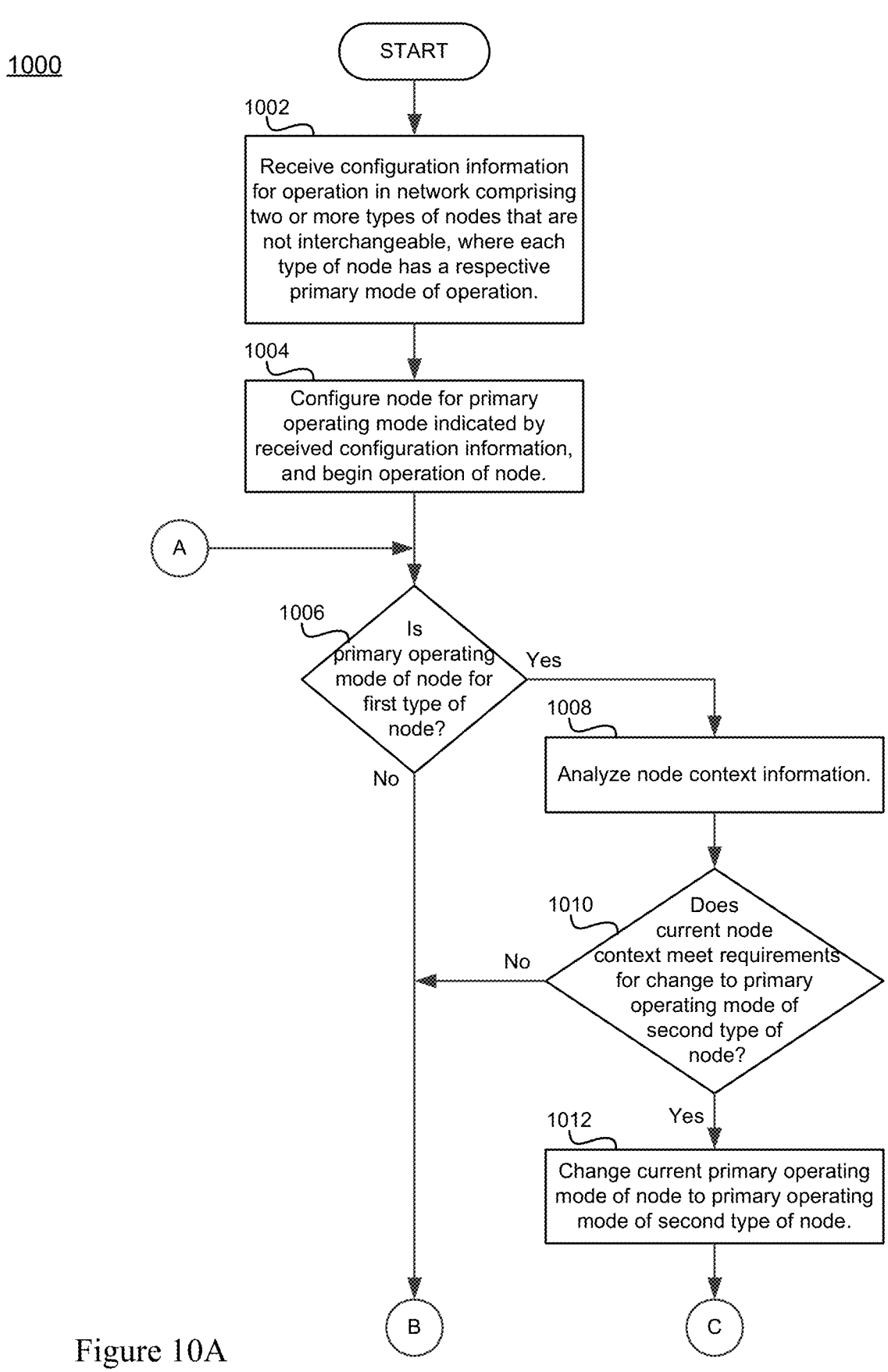
FIGS. 10A-10D are a flowchart illustrating an example method for operating a network node supporting node reconfiguration and change of primary operating mode of operation, role, or capacity, in accordance with various aspects of the present disclosure.
Figure 10B:
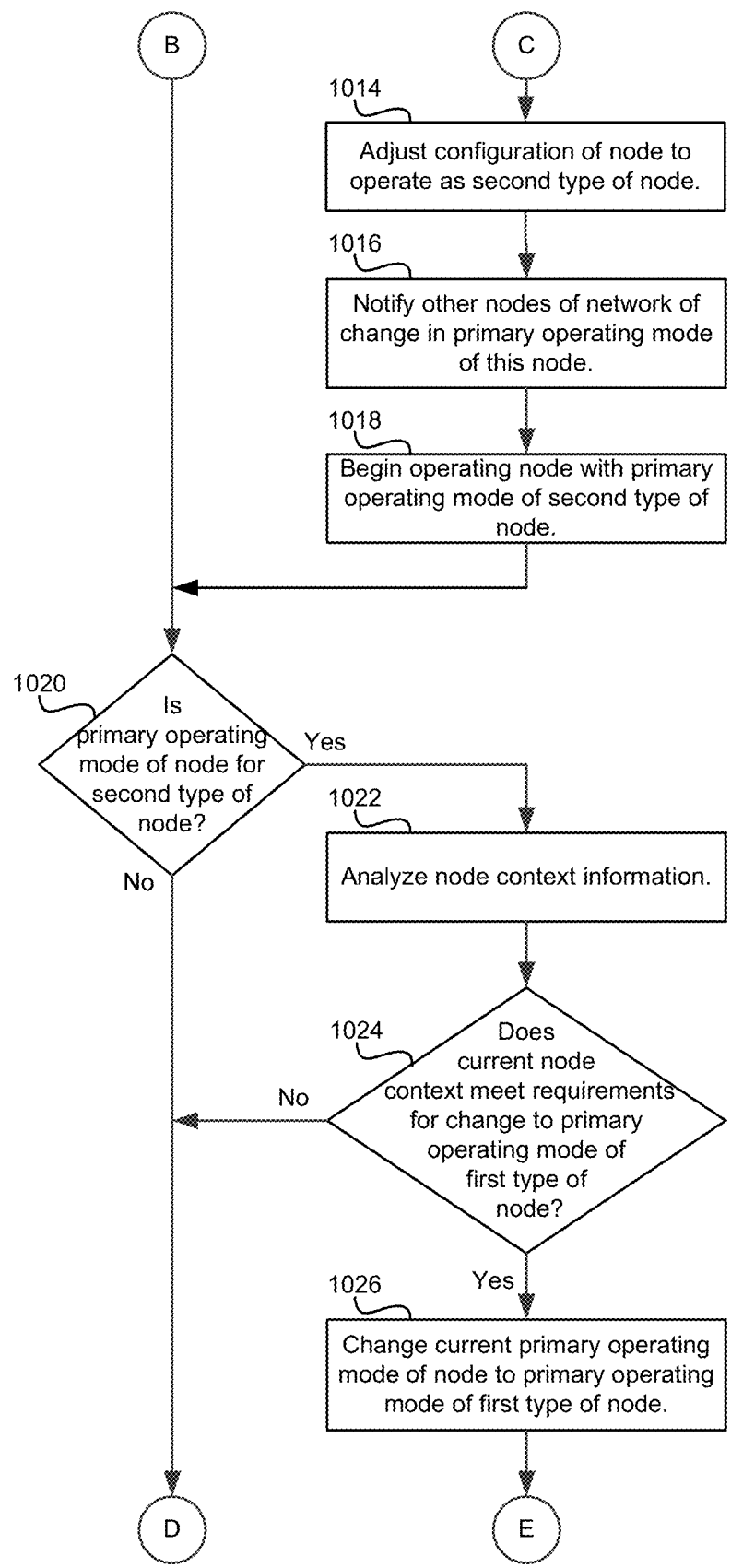

At block 1020 of FIG. 10B, the method may determine whether the primary operating mode or role of the node performing the method is that of a second type of node in the network. If the primary operating mode or role of the node is not the primary operating mode for a node of the second type, the method may continue at block 1034 of FIG. 10C, discussed below. If, however, the primary operating mode or role of the node is the primary operating mode for a node of the second type, the method may continue at block 1022, where the method may analyze context information for the node. As described above, the various nodes of a network as described herein (e.g., fixed APs, mobile APs, MCs/NCs, etc.) may each collect information about their current context including, for example, their wireless network context (e.g., RF signal environment including signal frequencies, signal strengths, source identities, etc.), their overall network context (e.g., information about the number, identity, operating mode/role, etc. of the neighboring nodes, the identity of their assigned NC/MC, etc.), their context within their physical environment (e.g., geographic location (e.g., latitude, longitude), speed, heading, whether the node is stopped or moving, etc.), and other information, as described herein. The method then continues at block 1024.

At block 1024, the method may determine whether the current node context information meets the conditions for a change of the primary operating mode or role to the primary operating mode of a node of the first type. For example, a mobile AP or OBU performing the method of FIGS. 10A-10D and currently operating as a node of the second type (e.g., FAP/RSU) may determine that current context information indicates that the node has begun to move. The node may, for example, determine that the node has too few end-user devices (e.g., below a certain minimum threshold number) connected to the Wi-Fi access point via which the MAP/OBU has been providing Wi-Fi service to riders of, or those in proximity to, the vehicle in which the node is installed. The node may also determine that a Wi-Fi hotspot that previously provided a high-bandwidth connection to the node is no longer within wireless communication range of the node, and that only lower-bandwidth or higher-cost communication technology options (e.g., DSRC, and/or cellular) are currently available. Those conditions may, for example, meet the requirements for the node to make a change of primary operating mode or role to the primary operating mode or role of a first type of node, namely, a mobile access point (e.g., MAP or OBU). If, at block 1024, the method determines that the node context information does not meet the context conditions for a change of the primary operating mode or role of the node to the primary operating mode or role of a node of the first type, the method may then continue at block 1034 of FIG. 10C, discussed below. If, however, the method determines, at block 1024, that the node context information meets the context conditions for a change of the primary operating mode or role of the node to the primary operating mode or role of a node of the first type, the method may then continue at block 1026, discussed below.

At block 1026, the method of FIGS. 10A-10D may, based on the determination at block 1024, change the primary operating mode or role of the node to be the primary operating mode or role of a node of the first type of node. For example, based on the context of the node, a mobile AP or OBU operating as a FAP/RSU may change its primary operating mode or role back to that of a mobile AP or OBU. Next, at block 1028 of FIG. 10C, the node may adjust the configuration of the node to operate as a node of the first type. For example, a node of a first type (e.g., a mobile AP or OBU according to the present disclosure) that is currently operating as a node of the second type (e.g., a FAP/RSU) may change the operation of a wireless network interface acting as a Wi-Fi station (STA) to instead act as a wireless access point (e.g., Wi-Fi, DSRC), and may adjust the configuration of other network interfaces to act as additional Wi-Fi access points compatible with end-user devices on the vehicle in which the mobile AP is installed. Then, at block 1030, the method may notify other nodes of the network of the change in the primary operating mode or role of the node, and at block 1032, the method may begin operation of the node in the new primary operating mode or role as a node of the first type of node (e.g., MAP/OBU).

Figure 10C:
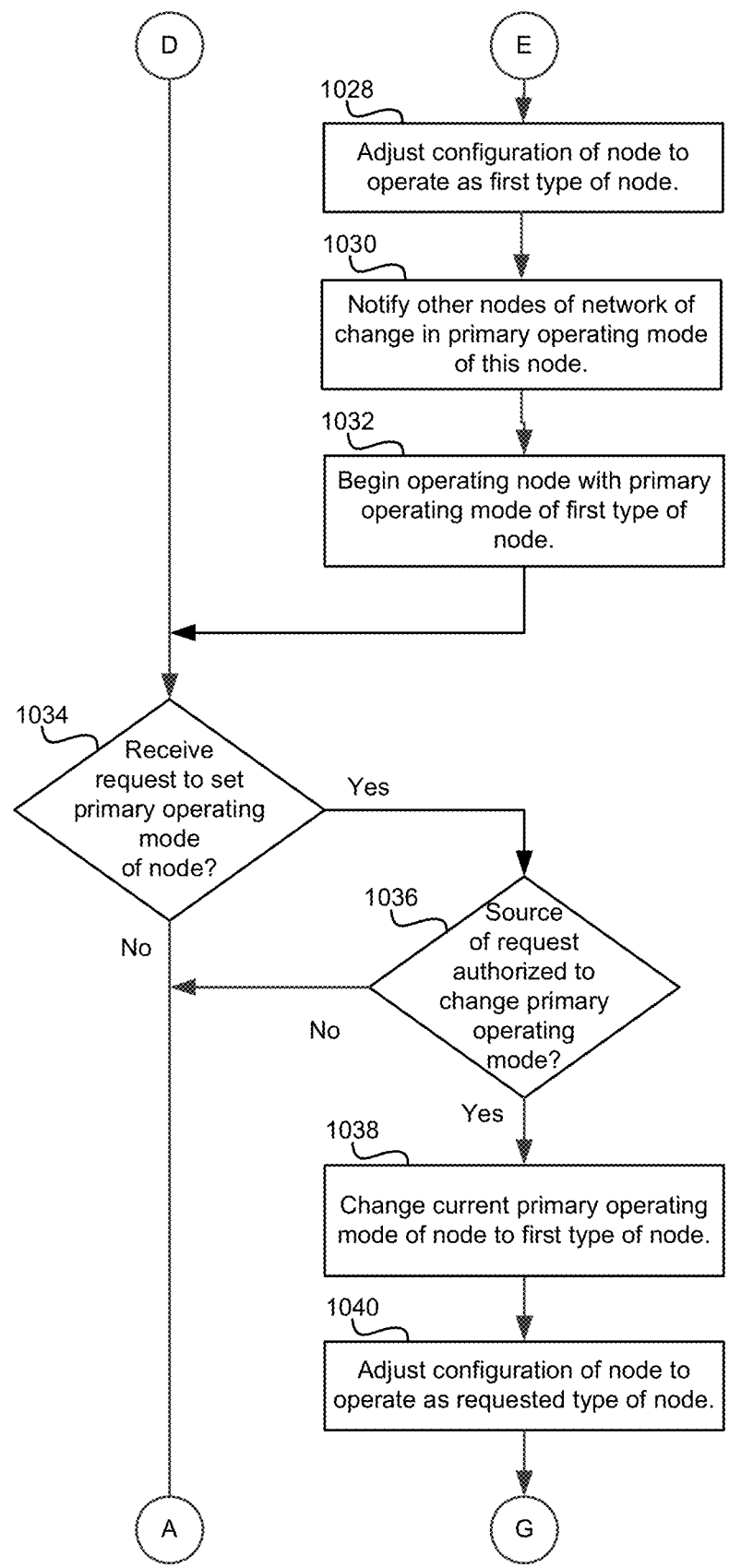
Figure 10D:
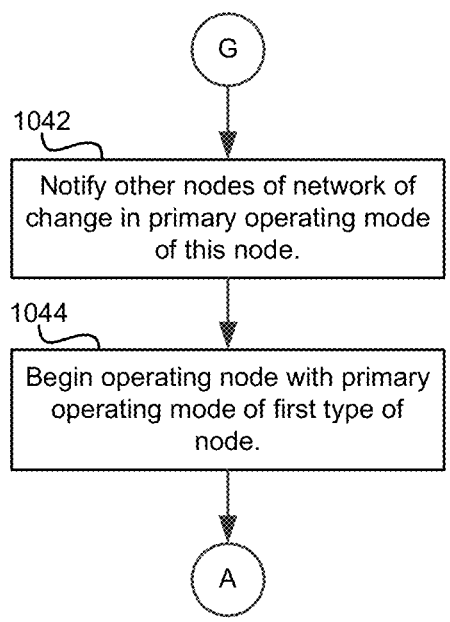

At block 1034 of FIG. 10C, the method of FIGS. 10A-10D may determine whether the node has received a request to set the primary operating mode or role of the node to a particular operating mode. This may occur, for example, when a cloud-based system responsible for management of the nodes of a network of moving things as described herein, or a neighboring node, determines that one or more certain nodes of the network are, for example, overloaded, or impaired, or any other conditions that may warrant changing operating modes or roles of one or more nodes of the network, and that one or more other nodes of the network may be "re-tasked" to function in place of or to assist, for example, the overloaded or impaired node(s). If, at block 1034, the method of FIGS. 10A-10D determines that the node has not received a request to set the primary operating mode or role of the node to a particular operating mode, then the method may continue at block 1006, described above. If, however, the method determines, at block 1034, that the node has received a request to set the primary operating mode or role of the node to a particular operating mode, the method of FIGS. 10A-10D may continue at block 1036, discussed below.

At block 1036, the method may determine whether the source of the request has the authority to request a change in the primary operating mode or role of the node. If it is determined that the source of the request does not have the authority to make such a request, the method may continue at block 1006. The node may, in accordance with some aspects of the present disclosure, notify a cloud-based system or one or more neighboring nodes that the node received an unauthorized request to change operating mode or role. If, however, it is determined that the source of the request does have the authority to make such a request then, at block 1038, the method may change the primary operating mode or role of the node to the requested operating mode. Next, at block 1040, the method may adjust the configuration of the node to operate according to the requested operating mode or role. Then, at block 1042 of FIG. 10D, the method may notify other nodes of the network of the change in the operating mode or role of the node that received the request, and at block 1044, the node that received the request may begin operating according to the primary operating mode or role received in the request. The method may then continue at block 1006, discussed above.

It should be noted that the example discussed above, regarding the method of FIGS. 10A-10D, describes a node whose primary operating mode or role is as a MAP/OBU that transitions its primary operating mode or role to act as a FAP/RSU, and is able to reverse such a change in operating mode or role, based on node context information. This example is only for purposes of illustration, and is not intended to limit the present disclosure in any way. Other types of nodes of a network such as the network described herein may change their primary operating mode or role to act as a different type of node with a different primary operating mode or role, without departing from the scope of the present disclosure. Further, although one type of node (e.g., a MAP/OBU) may be able to change its primary operating mode or role to operate as a second type of node (e.g., a FAP/RSU), a node of the second type (e.g., FAP/RSU) may not be able to change its primary operating mode or role to function as a node of the first type (e.g., a MAP/OBU, as a FAP/RSU is not mobile). In any case, a node in accordance with aspects of the present disclosure may always report changes in primary operating mode or role to one or more other network elements such as, for example, a neighbor node (i.e., a nearby node within wireless communication range), an NC/MC, and/or one or more cloud-based systems, so that the network behavior of the node may be monitored, and particular network behaviors enforced.

A change in the primary operating mode or role of a node according to various aspects of the present may be accomplished in several different ways. For example, in accordance with some aspects of the present disclosure, the nodes of a network may all have the same software, but operation in different primary operating modes or roles (e.g., OBU/MAP, RSU/FAP, NC/MC, etc.) may depend upon what software applications are actually running on the node at any point in time. Using that approach, changing the primary operating mode or role of a node from "RSU/FAP" to "MC/NC" may involve stopping some software application(s) of the node and running other software application(s) instead. It should be noted that configuration information for each node (e.g., OBU/MAP, RSU/FAP, NC/MC, etc.) in a configuration file distributed to nodes of the network may include configuration information for several different primary operating modes or roles of the node, in case the behavior/operation of the node needs to be slightly different according to node function.

A second example approach to supporting changes in primary operating mode or role may be used in nodes according to aspects of the present disclosure. For example, the storage device(s) of a node that are used to hold operating software may have multiple "partitions" (e.g., multiple "disk partitions," for those node systems using mechanical, flash-based, or battery-backed RAM-based "disk" storage devices), where each partition may contain a respective operating system, respective set of software applications, respective configuration information, respective operating parameters, etc., and changing between a first primary operating mode or role and a second primary operating mode or role may involve rebooting the node using a different partition of the node storage device/system.

A third example approach to supporting changes in the primary operating mode or role of a node in accordance with aspects of the present disclosure may also be used. For example, a same host operating system (OS)/application may be used in all operating modes, but software applications/configurations specific to each of the possible primary operating modes or roles may be containerized (e.g., using "software containers" such as, for example, "Docker), so that changing modes involves stopping execution of one software container for the first primary operating mode or role, and activating a second, different software container for the second primary operating mode or role. Additional information about the use of software containers in nodes of a network of moving things may be found in, for example, U.S. patent application Ser. No. 15/616,337, titled "Systems and Methods for Managing Containers in a Network of Moving Things," filed on Jun. 7, 2017, the complete subject matter of which is hereby incorporated herein by reference, in its entirety.

Various aspects of the present disclosure may be seen in a method of operating a network device of a wireless network comprising a plurality of network devices configured to wirelessly communicate with one another. Such a method may comprise receiving, via the wireless network by a first network device of the plurality of network devices, configuration information defining a set of operating modes of the first network device and one or more conditions in which the first network device is to transition between operating modes of the set of operating modes; and analyzing wireless network context information and node context information collected by the first network device. The method may also comprise determining whether to transition from a first operating mode of the set of operating modes to a second operating mode of the set of operating modes, based on the analysis and the one or more conditions; transitioning from the first operating mode of the set of operating modes to the second operating mode of the set of operating modes, based upon the determining; and receiving a message requesting a transition of the first network device from a current operating mode to a requested operating mode of the set of operating modes. The method may further comprise wirelessly broadcasting changes of operating mode of the first network device to neighboring network devices of the plurality of network devices.

In accordance with various aspects of the present disclosure, the set of operating modes may be representative of a primary operating mode in which the first network device operates immediately following receipt of the configuration information, and may be representative of any alternative operating modes in which the first network device is operable. The primary operating mode of the first network device may function as a vehicle-mounted mobile network device; and the first network device may directly communicate with at least one vehicle system via a bus for communication between components of the vehicle. The configuration information may be received from a shared, cloud-based system that manages operation of the wireless network. The message requesting the transition of operation of the first network device from the current operating mode to the requested operating mode may originate from a second network device of the plurality of network devices, and the second network device may issue the message requesting the transition of operation of the first network device based upon behavior of the first network node observed by the second network device. In addition, the set of operating modes for the first network device may comprise one or more primary operating modes selected from a set of primary operating modes comprising a primary operating mode of a network device that is located at a fixed physical location in a service area of the wireless network and a primary operating mode of a network device that is transported by a vehicle that moves about the service area of the wireless network.

Additional aspects of the present disclosure may be found in a non-transitory computer-readable medium on which is stored a plurality of code sections, where each code section may comprise a plurality of instructions executable by one or more processors. The plurality of instructions may cause the one or more processors to perform the actions of a method of operating a network device of a wireless network comprising a plurality of network devices configured to communicate with one another, where the actions of the method are as in the method described above.

Further aspects of the present disclosure may be seen in a system for a network device of a wireless network comprising a plurality of network devices configured to communicate with one another. Such a system may comprise, in a first network device of the plurality of network devices, one or more processors operably coupled to at least one wireless communication interface configurable to communicate with other network devices of the plurality of network devices of the wireless network. The one or more processors of such a system may be operable to, at least, perform the actions of a method such as the method described above.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of operating a network device of a wireless network comprising a plurality of network devices configured to wirelessly communicate with one another, the method comprising:

receiving, via the wireless network by a first network device of the plurality of network devices, configuration information defining a set of operating modes of the first network device and one or more conditions in which the first network device is to transition between operating modes of the set of operating modes;

analyzing wireless network context information and node context information collected by the first network device;

determining whether to transition from a first operating mode of the set of operating modes to a second operating mode of the set of operating modes, based on the analysis and the one or more conditions;

transitioning from the first operating mode of the set of operating modes to the second operating mode of the set of operating modes, based upon the determining;

receiving a message requesting a transition of the first network device from a current operating mode to a requested operating mode of the set of operating modes; and wirelessly broadcasting changes of operating mode of the first network device to neighboring network devices of the plurality of network devices.

2. The method according to claim 1, wherein the set of operating modes is representative of a primary operating mode in which the first network device operates immediately following receipt of the configuration information, and is representative of any alternative operating modes in which the first network device is operable.

3. The method according to claim 1, wherein a primary operating mode of the first network device functions as a vehicle-mounted mobile network device.

4. The method according to claim 3, wherein the first network device directly communicates with at least one vehicle system via a bus for communication between components of the vehicle.

5. The method according to claim 1, wherein the configuration information is received from a shared, cloud-based system that manages operation of the wireless network.

6. The method according to claim 1, wherein the message requesting the transition of operation of the first network device from the current operating mode to the requested operating mode originates from a second network device of the plurality of network devices, and wherein the second network device issues the message requesting the transition of operation of the first network device based upon behavior of the first network node observed by the second network device.

7. The method according to claim 1, wherein the set of operating modes for the first network device comprises one or more primary operating modes selected from a set of primary operating modes comprising a primary operating mode of a network device that is located at a fixed physical location in a service area of the wireless network and a primary operating mode of a network device that is transported by a vehicle that moves about the service area of the wireless network.

8. A non-transitory computer-readable medium on which is stored a plurality of code sections, wherein each code section comprises a plurality of instructions executable by one or more processors to cause the one or more processors to perform the actions of a method of operating a network device of a wireless network comprising a plurality of network devices configured to wirelessly communicate with one another, the actions of the method comprising:
　receiving, via the wireless network by a first network device of the plurality of network devices, configuration information defining a set of operating modes of the first network device and one or more conditions in which the first network device is to transition between operating modes of the set of operating modes;
　analyzing wireless network context information and node context information collected by the first network device;
　determining whether to transition from a first operating mode of the set of operating modes to a second operating mode of the set of operating modes, based on the analysis and the one or more conditions;
　transitioning from the first operating mode of the set of operating modes to the second operating mode of the set of operating modes, based upon the determining;
　receiving a message requesting a transition of the first network device from a current operating mode to a requested operating mode of the set of operating modes; and
　wirelessly broadcasting changes of operating mode of the first network device to neighboring network devices of the plurality of network devices.

9. The non-transitory computer-readable medium according to claim 8, wherein the set of operating modes is representative of a primary operating mode in which the first network device operates immediately following receipt of the configuration information, and is representative of any alternative operating modes in which the first network device is operable.

10. The non-transitory computer-readable medium according to claim 8, wherein a primary operating mode of the first network device functions as a vehicle-mounted mobile network device.

11. The non-transitory computer-readable medium according to claim 10, wherein the first network device directly communicates with at least one vehicle system via a bus for communication between components of the vehicle.

12. The non-transitory computer-readable medium according to claim 8, wherein the configuration information is received from a shared, cloud-based system that manages operation of the wireless network.

13. The non-transitory computer-readable medium according to claim 8, wherein the message requesting the transition of operation of the first network device from the current operating mode to the requested operating mode originates from a second network device of the plurality of network devices, and wherein the second network device issues the message requesting the transition of operation of the first network device based upon behavior of the first network node observed by the second network device.

14. The non-transitory computer-readable medium according to claim 8, wherein the set of operating modes for the first network device comprises one or more primary operating modes selected from a set of primary operating modes comprising a primary operating mode of a network device that is located at a fixed physical location in a service area of the wireless network and a primary operating mode of a network device that is transported by a vehicle that moves about the service area of the wireless network.

15. A system for a network device of a wireless network comprising a plurality of network devices configured to wirelessly communicate with one another, the system comprising:
　in a first network device of the plurality of network devices,
　one or more processors operably coupled to at least one wireless communication interface configurable to communicate with other network devices of the plurality of network devices of the wireless network, the one or more processors operable to, at least:
　receive, via the wireless network by a first network device of the plurality of network devices, configuration information defining a set of operating modes of the first network device and one or more conditions in which the first network device is to transition between operating modes of the set of operating modes;
　analyze wireless network context information and node context information collected by the first network device;
　determine whether to transition from a first operating mode of the set of operating modes to a second operating mode of the set of operating modes, based on the analysis and the one or more conditions;
　transition from the first operating mode of the set of operating modes to the second operating mode of the set of operating modes, based upon the determining;
　receive a message requesting a transition of the first network device from a current operating mode to a requested operating mode of the set of operating modes; and wirelessly broadcast changes of operating mode of the first network device to neighboring network devices of the plurality of network devices.

16. The system according to claim 15, wherein the set of operating modes is representative of a primary operating mode in which the first network device operates immediately following receipt of the configuration information, and is representative of any alternative operating modes in which the first network device is operable.

17. The system according to claim 15, wherein a primary operating mode of the first network device functions as a vehicle-mounted mobile network device.

18. The system according to claim 17, wherein the first network device directly communicates with at least one vehicle system via a bus for communication between components of the vehicle.

19. The system according to claim 15, wherein the configuration information is received from a shared, cloud-based system that manages operation of the wireless network.

20. The system according to claim 15, wherein the message requesting the transition of operation of the first network device from the current operating mode to the requested operating mode originates from a second network device of the plurality of network devices, and wherein the second network device issues the message requesting the transition of operation of the first network device based upon behavior of the first network node observed by the second network device.

21. The system according to claim 15, wherein the set of operating modes for the first network device comprises one or more primary operating modes selected from a set of primary operating modes comprising a primary operating mode of a network device that is located at a fixed physical location in a service area of the wireless network and a primary operating mode of a network device that is transported by a vehicle that moves about the service area of the wireless network.

* * * * *